(12) United States Patent
Yamashita

(10) Patent No.: US 7,208,985 B2
(45) Date of Patent: Apr. 24, 2007

(54) SEMICONDUCTOR DEVICE FOR CONTROLLING SWITCHING POWER SUPPLY

(75) Inventor: Tetsuji Yamashita, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 54 days.

(21) Appl. No.: 11/089,331

(22) Filed: Mar. 25, 2005

(65) Prior Publication Data

US 2005/0218942 A1 Oct. 6, 2005

(30) Foreign Application Priority Data

Mar. 31, 2004 (JP) ............... 2004-101622

(51) Int. Cl.
*H03K 3/023* (2006.01)
(52) U.S. Cl. ............... 327/108; 327/110; 323/285
(58) Field of Classification Search ............... 327/108, 327/376–379, 389, 109–111; 323/284, 285
See application file for complete search history.

(56) References Cited

U.S. PATENT DOCUMENTS

| 5,929,664 A | * | 7/1999 | Alleven | 327/108 |
|---|---|---|---|---|
| 5,940,448 A | * | 8/1999 | Kuo | 375/316 |
| 6,111,453 A | * | 8/2000 | Uchida et al. | 327/384 |
| 6,294,903 B1 | * | 9/2001 | Yamashita et al. | 323/282 |
| 6,469,913 B2 | * | 10/2002 | Hosotani et al. | 363/16 |
| 6,778,001 B2 | * | 8/2004 | Mayama et al. | 327/427 |
| 6,873,201 B2 | * | 3/2005 | Panhofer | 327/427 |
| 6,917,234 B2 | * | 7/2005 | Horn et al. | 327/309 |
| 6,960,906 B2 | * | 11/2005 | Yamashita | 323/285 |
| 6,972,611 B1 | * | 12/2005 | Thalheim | 327/434 |
| 7,075,802 B2 | * | 7/2006 | Yamashita | 363/21.12 |

FOREIGN PATENT DOCUMENTS

JP 2002315333 10/2002

* cited by examiner

*Primary Examiner*—Timothy P. Callahan
*Assistant Examiner*—Hai L. Nguyen
(74) *Attorney, Agent, or Firm*—Steptoe & Johnson LLP

(57) ABSTRACT

In a semiconductor device for controlling switching power supply of this invention, having a switching element and switching operation control circuit, after receiving a current detection signal when switching is turned off, a fixed delay time is applied to the current detection signal by a delay circuit so that switching turn-on control by a transformer reset pulse signal obtained based on a signal from the tertiary windings of the transformer is not accepted within a blanking time corresponding to the delay time. Thus, the switching by the switching element is halted.

6 Claims, 16 Drawing Sheets

F I G. 7
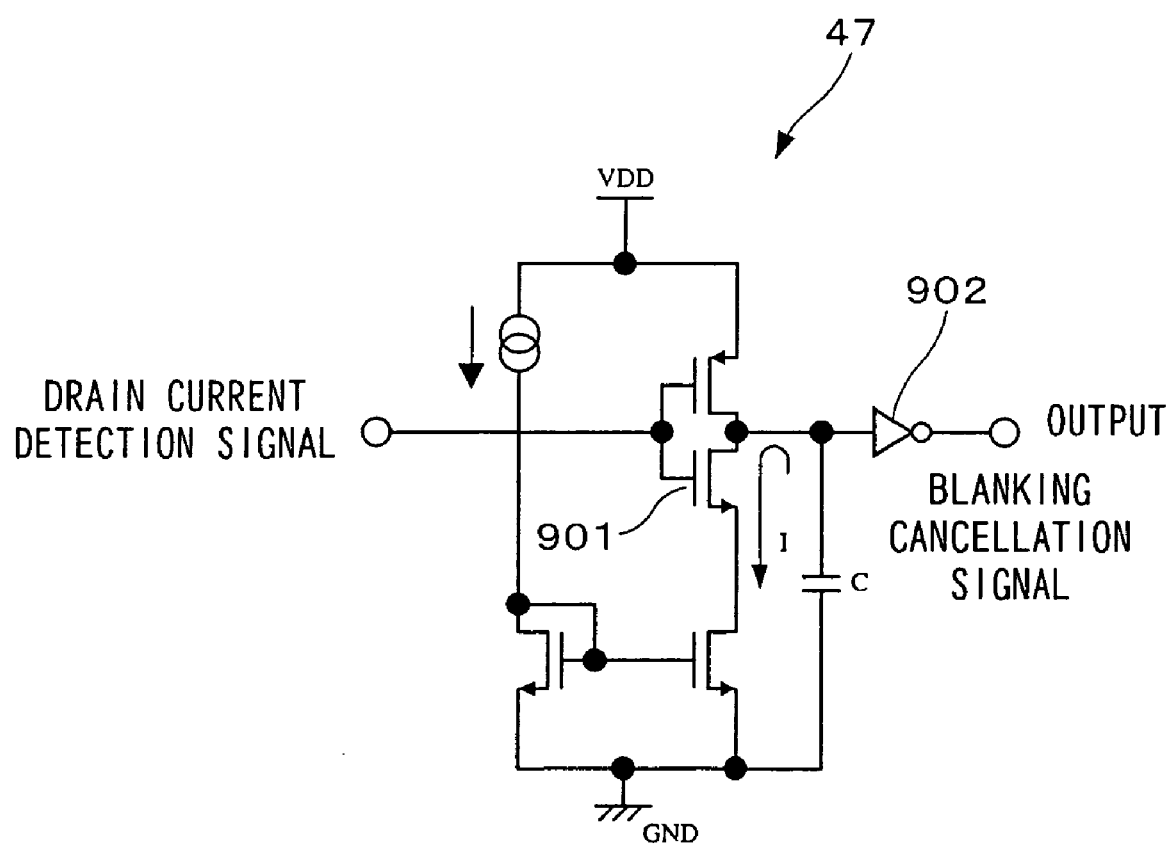

SEMICONDUCTOR DEVICE FOR CONTROLLING SWITCHING POWER SUPPLY

BACKGROUND OF THE INVENTION

1. Field of the Invention

This invention relates to a semiconductor device for controlling switching power supply, which controls the output voltage of a switching power supply through switching operation.

2. Description of the Related Art

Switching power supply devices, which use switching power supply semiconductor devices to control (stabilize and similar) an output voltage by utilizing the switching operation of semiconductors (transistors or other switching elements), have come to be widely used as the power supplies of home appliances and other equipment for home use, for the purpose of improving power efficiency through reduced power consumption and similar.

In recent years in particular, attention has been paid to reduction of power consumption through operation idling (standby) in home appliances and other equipment, from the standpoint of measures to prevent global warming, and there have been strong demands for switching power supplies with lower power consumption during standby.

In order to respond to such demands, power supply systems have for example been developed in which a switching power supply for use as the main power supply which supplies power when at a rated load in the normal operating state of the equipment (normal mode), and a switching power supply for standby use which supplies power during standby when the equipment is in a standby operating state (standby mode), are provided; when the equipment is in standby, power is supplied from the switching power supply for standby, and when at the rated load power is supplied by the switching power supply for main power, so that two switching power supplies are used selectively according to the operating mode of the equipment.

Such power supply systems have the defect that two switching power supply devices (converters) are necessary, entailing increase overall costs of the circuitry, including the semiconductor devices for controlling switching power supply. Hence when it is necessary to hold down costs and in other cases, often a power supply system is adopted which comprises a single switching power supply device (converter). In such cases, partial resonance-type power supplies are often used as the switching power supply, out of considerations of power supply efficiency and noise.

However, during light loading while in standby or at other times, the semiconductor devices used in control of switching power supplies such as those described above must constantly be supplied with currents for internal circuits through the transformer, even though the current flowing in switching elements is reduced. Hence the current flowing in the switching power supply, including the current flowing in switching elements, cannot be made zero, and so even under no-load conditions, a current of a certain size flows. Hence even when there is no load, losses occur due to the switching operation in switching elements, and the lighter the load, the greater is the fraction of such losses in switching elements. Consequently the power efficiency of the switching power supply is reduced, and so there is the problem that the desire for reduced power consumption when the power supply is in standby cannot be realized.

Further, in a partial resonance-type switching power supply the oscillation frequency rises under light loads, so that switching losses are increased, and there is the problem that the power supply efficiency is lowered in standby mode.

(Prior Art 1)

As one proposal to resolve the above problem of a lowered power supply efficiency in standby mode (see for example Japanese Patent Laid-open No. 2002-315333), control technology is introduced in which the secondary-side loading state of the power supply is detected by a microcomputer, the signal thereof is received, a transition is made to standby state, and intermittent oscillation based on the commercial power frequency is executed through feedback control. In this case, in order to improve the power supply efficiency in standby mode, feedback control is executed by a microcomputer such that when the load is light and the output voltage rises to equal to or greater than a prescribed value, switching operation by the switching element is halted, and thereafter, when the output voltage falls below a prescribed value, switching operation by the switching element is resumed.

In this switching power supply, the oscillation frequency during intermittent switching operation is fixed regardless of the load state, and so this solution is far from adequate with respect to improvement of the power supply efficiency during standby.

(Prior Art 2)

To resolve the above problems, a switching power supply device such as the following is conceivable. This switching power supply device is explained below in summary fashion using FIG. 16.

FIG. 16 is a circuit diagram showing an example of one configuration of a conventional switching power supply device. As shown in FIG. 16, in this switching power supply device a DC input voltage VIN is applied to switching element 1 via the primary windings 103a of the transformer 103; through the switching operation of the switching element 1, the DC output voltage $V_o$, obtained by rectification and smoothing of the alternating current appearing across the secondary windings 103b of the transformer 103 by a rectifier 104 and capacitor 105, is controlled, and power is supplied to the load 109. This switching power supply device has a transformer reset detection circuit 13, which detects the reset state of the transformer 103 occurring due to the switching operation of the switching element 1 from the AC voltage occurring across the tertiary windings 103c of the transformer 103, and outputs a transformer reset detection signal indicating the reset state; an I-V converter 21, which converts a control current, obtained through the output voltage detection circuit 106 and phototransistor 110 based on the change in DC voltage $V_o$ arising across the secondary windings 103b of the transformer 103, into a voltage corresponding to the current value; and a light-loading detection circuit 24 which, upon detecting light loading as a load state indicating the magnitude of power supplied to the load 109 based on the output voltage VEAO from the I-V converter 21, outputs a control signal to control intermittent operation of switching by the switching element 1. These portions together comprise a portion of the control circuitry which drives the control electrode (gate electrode) of the switching element 1.

When the output voltage VEAO from the I-V converter 21 becomes smaller than a light-loading detection lower-limit voltage VR1 for detection of light loading, the light-loading detection circuit 24 halts the switching operation of the switching element 1, and when the output voltage VEAO from the I-V converter 21 becomes greater than the light-loading detection upper-limit voltage VR2 for detection of light loading, the light-loading detection circuit 24 outputs a control signal to control intermittent operation such that the switching element 1 resumes switching operation. The control circuitry is configured such that the control electrode (gate electrode) of the switching element 1 is driven to control intermittent operation during light loading, based on the transformer reset detection signal from the transformer reset detection circuit 13 and the control signal from the light-loading detection circuit 24.

Operation of a switching power supply device configured as described above is briefly explained. Here, the power supply operation of a semiconductor device for controlling switching power supply, which performs intermittent operation of switching by the switching element when a light load is detected, is explained.

In FIG. 16, when the internal circuitry rises to a reference voltage the control circuitry is started, and thereafter, when the voltage at the terminal 41 rises due to the capacitor 118 connected between the terminal 41 and terminal 42 to reach the startup voltage, the power MOSFET or other switching element 1 is turned on to enter the on state; when the drain voltage thereof reaches an overcurrent detection level determined by the feedback current due to the photocoupler current flowing from the output voltage detection circuit 106 connected to the secondary windings 103b of the transformer 103 to the phototransistor 110, the switching element 1 is turned off and enters the off state. When the switching element 1 is turned off, the drain voltage undergoes ringing due to the resonance between the inductance of the transformer 103 and the drain-source capacitance of the switching element 1.

Thus, once the semiconductor device for controlling switching power supply is started, the next turn-on signal is detected by means of the tertiary windings (bias windings) 103c of the transformer 103; but within the control circuitry the bias windings voltage is clamped at a + or − level, and when the bias windings voltage falls below a preset value in the control circuitry, a turn-on signal is output. A resistance 116 and capacitance 117 are connected to the bias windings detection terminal 44, and the time constant resulting from the values of the resistance 116 and capacitance 117 is adjusted so as to obtain timing such that the switching element 1 is turned on at the bottom of the drain voltage of the switching element 1.

The above operation is repeated so as to obtain the desired output voltage $V_o$; but in order to improve the power supply efficiency under light loads, by executing intermittent oscillation control (intermittent switching operation) in which switching operation by the switching element 1 is halted when the feedback current equals or exceeds a certain fixed value, and switching operation by the switching element 1 is resumed when the feedback current falls below a certain fixed value, the power supply efficiency under light loads is improved and power consumption is reduced.

Quasi-resonant ringing choke converter (RCC) control is one method of control of switching operation by the switching element 1; the switching loss when the switching element is turned on can be reduced, and the noise level can be lowered, making the method suitable to market demands for low-noise, high-efficiency, high-power output. And under light loads, intermittent switching operation occurs through intermittent oscillation control, so that the increase in switching frequency under light loading which is generally a problem with RCC is suppressed, and switching losses under light loads can be reduced to some extent.

However, because a conventional switching power supply such as that described above is under RCC control, the lighter the load on the secondary-windings side of the transformer, the higher is the switching frequency, so that there are the problems that the switching loss per unit time in the switching element 1 increases, and that during light loading such as in standby mode the power supply efficiency is worsened.

SUMMARY OF THE INVENTION

In order to resolve the above-described problems of the prior art, an object of this invention is to provide a semiconductor device for controlling switching power supply able to suppress high-frequency operation under light loads to reduce switching losses, improve power supply efficiency under light loading, and reduce power consumption under light loading.

In order to attain the above object, a semiconductor device for controlling switching power supply of this invention is a device in a switching power supply in which an input DC voltage is applied to a switching element through the primary windings of a transformer, and the switching operation of the switching element controls the DC voltage obtained by rectifying and smoothing the alternating current appearing across the secondary windings of the transformer, to supply power to a load, and comprises a control circuit including: a transformer reset detection circuit for detecting the reset state of the transformer occurring due to switching operation of the switching element from the AC voltage occurring across tertiary windings of the transformer, and outputting a transformer reset detection signal indicating the reset state; an I-V converter for converting into a voltage the current value of a control current indicating the change in the DC voltage based on the alternating current appearing across the secondary windings of the transformer; and current detection signal output means for detecting a current flowing in the switching element based on the output voltage from the I-V converter, and outputting a current detection signal to control switching turn-on action of the switching element according to the detected value, wherein the control electrode of the switching element is driven by the control circuit based on the transformer reset detection signal from the transformer reset detection circuit and the current detection signal from the current detection signal output means, to control switching operation of the switching element. A delay circuit is provided which applies a prescribed delay time to the current detection signal from the current detection signal output means, configured so that the transformer reset detection signal from the transformer reset detection circuit is masked until output of the current detection signal with prescribed time delay applied by the delay circuit, so as to halt switching operation of the switching element.

Further, a semiconductor device for controlling switching power supply of this invention is provided with a light loading detection circuit which, upon detecting light loading as a load state indicating the power supplied to the load based on a change in output voltage from the I-V converter, outputs a control signal to control intermittent operation of switching by the switching element; the light loading detection circuit is configured so as to output a control signal to control the intermittent operation such that switching operation of the switching element is halted when the output voltage from the I-V converter falls below the light loading detection lower limit voltage for detection of light loading, and such that the switching operation of the switching element is resumed when the output voltage from the I-V converter rises above the light loading detection upper limit voltage for detection of light loading. By means of this control circuit, the control electrode of the switching element is driven to control the intermittent operation based on the transformer reset detection signal from the transformer reset detection circuit and the control signal from the light loading detection circuit.

Further, a semiconductor device for controlling switching power supply of this invention integrates the above switching element and the above control circuit on the same semiconductor substrate, and includes on the semiconductor substrate as external connection terminals, at least, a switching element input terminal for inputting to the input voltage to the switching element through the transformer primary windings, a switching element output terminal for outputting the switching current obtained by switching operation of the switching element, a power supply terminal for supplying to the control circuit a DC voltage based on the current appearing across the tertiary windings of the transformer through switching operation of the switching element, a control terminal for inputting a control signal to control switching operation of the switching element, based on the DC voltage across the transformer secondary windings which changes according to the load state, and a transformer reset detection terminal for supplying the transformer reset detection signal to the transformer reset detection circuit.

By means of the above invention, by applying a fixed delay time to a current detection signal after receiving the current detection signal when switching is turned off, switching turn-on control by the transformer reset pulse signal obtained based on a signal from the transformer tertiary windings is not accepted within a blanking time corresponding to the delay time, so that switching of the switching element can be halted.

As a result, high-frequency operation under light loads can be suppressed to reduce switching losses, and the power supply efficiency under light loads can be improved, reducing power consumption under light loading. In addition, because of quasi-resonant operation, higher efficiency and lower noise can easily be realized over the entire load range from light loads to heavy loads, even during normal operation.

BRIEF DESCRIPTION OF THE DRAWINGS

FIG. 7 is a circuit diagram showing one configuration example of the delay circuit in the semiconductor device for controlling switching power supply according to the Embodiment 1;

DESCRIPTION OF THE PREFERRED EMBODIMENTS

Figure 1:
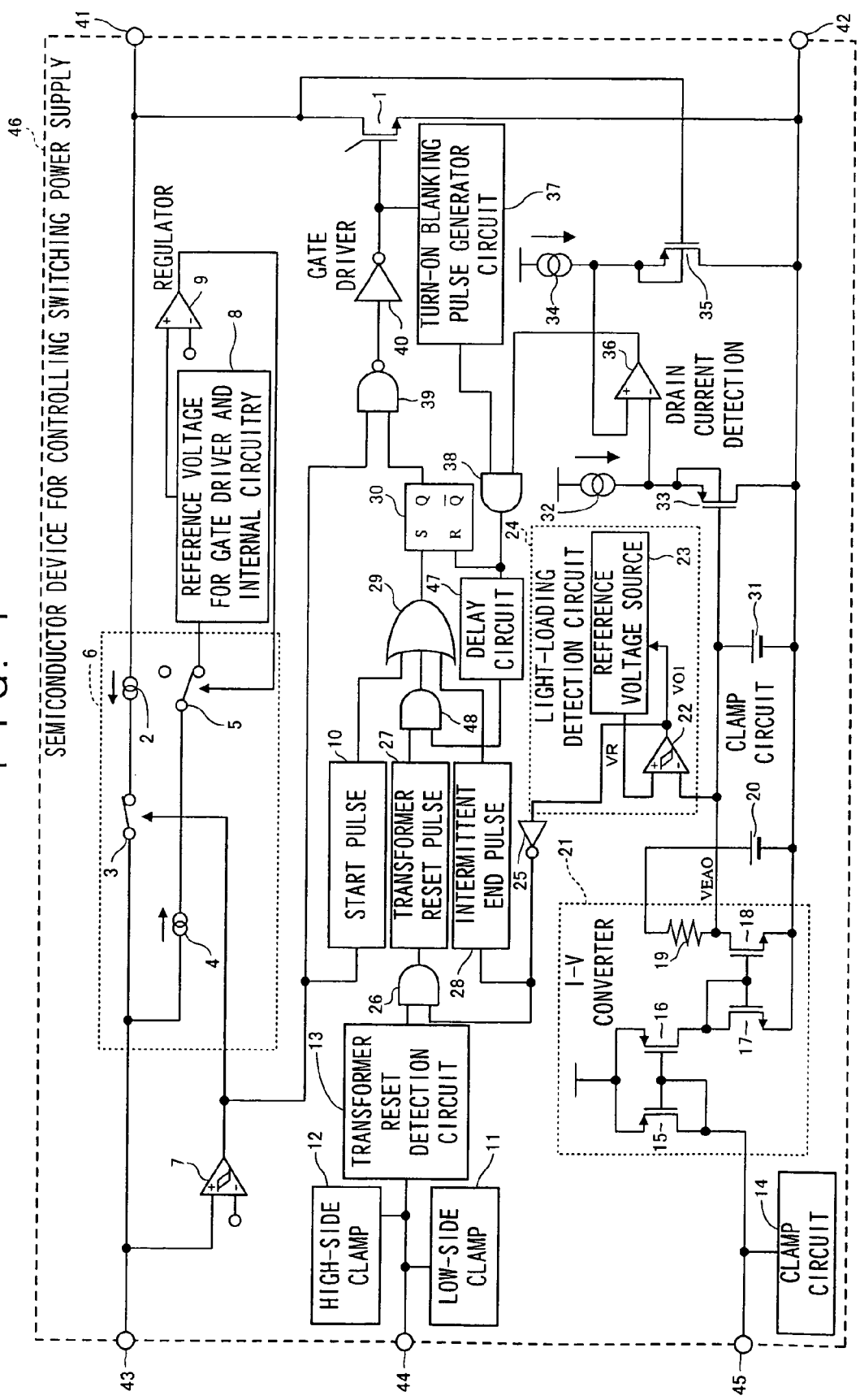
FIG. 1 is a circuit diagram showing one configuration example of a semiconductor device for controlling switching power supply according to Embodiment 1 of the invention.

Below, specific explanations are given of semiconductor devices for controlling switching power supply illustrating embodiments of the invention, referring to the drawings.

(Embodiment 1)

The semiconductor device for controlling switching power supply of Embodiment 1 of the invention is explained.

Figure 2:
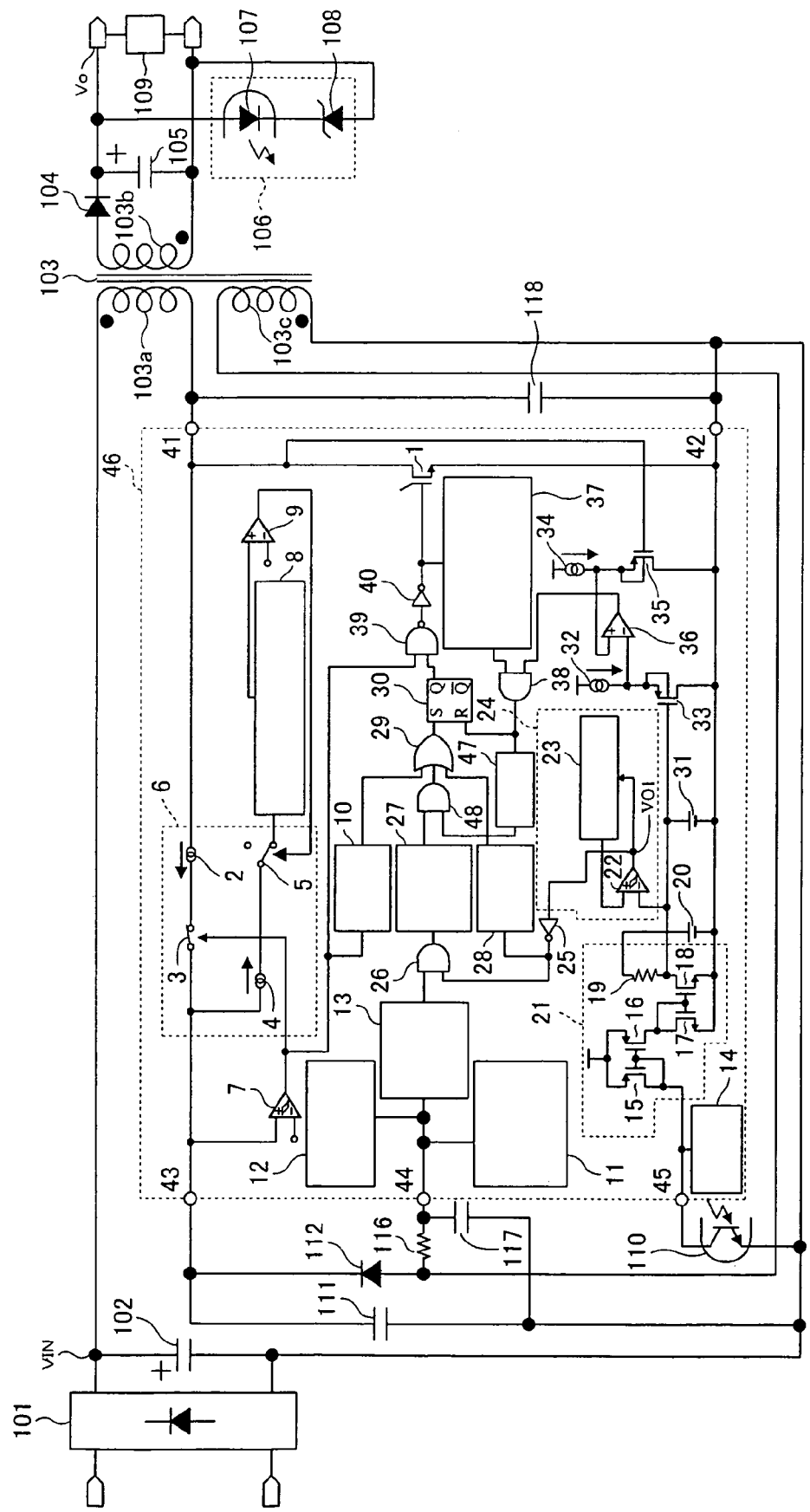
FIG. 2 is a circuit diagram showing one configuration example of a switching power supply device comprising the semiconductor device for controlling switching power supply according to the Embodiment 1.

FIG. 1 is a circuit diagram showing one configuration example of the semiconductor device for controlling switching power supply of Embodiment 1 of the invention. FIG. 2 is a circuit diagram showing one configuration example of a switching power supply device comprising the semiconductor device for controlling switching power supply of Embodiment 1.

The semiconductor device for controlling switching power supply 46 shown in FIG. 1 is provided with a light-loading detection circuit 24, to which is provided the output voltage VEAO resulting from voltage conversion by the I-V converter 21 of the current flowing from the control terminal 45. In this light-loading detection circuit 24 is provided a light-loading detection comparator 22. As the negative input of the light loading detection comparator 22, the output voltage VEAO output from the I-V converter is applied; as the positive input, a reference voltage VR output from a reference voltage source 23 is applied. The light loading detection comparator 22 compares the input output voltage VEAO and the reference voltage VR, and when the output voltage VEAO is lower than the reference voltage VR outputs a prescribed output signal VO1 to the AND circuit 26 through the inverter 25. The output signal VO1 of the light loading detection comparator 22 is also applied to the reference voltage source 23, and the reference voltage source 23 is configured such that the output voltage VR changes upon receiving the output signal VO1 of the light loading detection comparator 22.

As the other input signal to the AND circuit 26, the transformer reset detection signal output from the transformer reset detection circuit 13 upon detecting a voltage at the transformer reset detection terminal 44 is applied as a clock signal; the output of the AND circuit 26 is applied to a transformer reset pulse generator circuit 27 which generates a transformer reset pulse in one-shot pulse mode. Upon light loading detection, that is, when the switching element 1 is halted, the amplitude of resonant operation is small due to the halted time, and because there is concern that the transformer reset signal may not be detected, the transformer reset pulse generator circuit 27 is kept from operating.

The output VO1 from the light-loading detection comparator 22 is input to an intermittent end pulse generator circuit 28 through an inverter 25; after the end of the halted period, the output of the intermittent end pulse generator circuit 28 is input to an OR circuit 29, the output signal of which is input as a set signal to an RS flip-flop 30. The output signal from the RS flip-flop 30 is input to a NAND circuit 39, the output of which is output to the gate of the switching element (a power MOSFET) 1 through a gate driver 40. Thus, switching control is executed so that, by means of the light-loading detection comparator 22, when a light-loading state which is a wait state is detected the transformer reset detection circuit 13 is kept from operating, and by means of the output signal from the intermittent end pulse generator circuit 28, switching by the switching element 1 is resumed.

In this semiconductor device for controlling switching power supply 46, a power MOSFET or similar, as the switching element 1, and a control circuit to execute switching control of the switching element 1, are integrated on the same semiconductor substrate; five terminals are comprised, which are an input terminal 41 and output terminal 42 for the switching element 1, a start voltage detection terminal for the semiconductor device for controlling switching power supply 46 and power supply terminal for the control circuit 43, a control terminal 45 for input of a control signal, and a bias windings (tertiary windings) voltage detection terminal (transformer reset detection terminal) 44 of the transformer 103.

The regulator 6 is connected between the input terminal 41 of the switching element 1, the start voltage detection terminal 43, and a reference voltage supply 8 for the control circuit and gate driver; when the voltage at the input terminal 41 of the switching element 1 becomes equal to or exceeds a fixed value, the regulator 6 supplies an internal circuit current to the semiconductor device for controlling switching power supply 46, and through the comparator 9 executes control such that the voltages of the control circuit and gate driver reference voltage supply 8 of the semiconductor device for controlling switching power supply 46 are fixed.

The output from the start/stop circuit comparator 7 is output to the NAND circuit 39, the output signal of which is output to the gate of the switching element 1 through the gate driver 40, and the switching element 1 is controlled so as to oscillator and halt according to the magnitude of the voltage at the terminal 43.

14 is a clamping circuit, and is connected to the control terminal 45; because a phototransistor 110 or similar is connected externally to the semiconductor device for controlling switching power supply 46, the potential is set to a fixed value.

21 is an I-V converter, which internally converts the current flowing from the control terminal 45 into a voltage. A high-side clamping circuit 12 and low-side clamping circuit 11 are connected to the terminal 44 at which the voltage of the bias windings 103c of the transformer 103 is detected, to limit the voltage input to the internal circuitry of the semiconductor device for controlling switching power supply 46. Also, the transformer reset detection circuit 13 is connected to terminal 44, and the timing of the turn-on signal for the switching element 1 is determined by the one-shot pulse (transformer reset) generator circuit 27.

10 is a start pulse (startup pulse) generator circuit, which outputs a signal as a result of an output signal, that is, start signal, from the comparator 7, which passes through the OR circuit 29 and is input to the set terminal of the RS flip-flop 30, the output Q of which is input to the NAND circuit 39.

After startup, the output signal Q of the RS flip-flop 30 goes to H due to a start pulse signal and, during normal operation, a one-shot (transformer reset) pulse signal via the OR circuit 29, to put the switching element 1 into the turned-on state.

After the switching element 1 is turned on, the voltage resulting from the current flowing in the switching element 1 and the turn-on resistance of the switching element 1, that is, the turn-on voltage, is input to the positive side of the drain current detection comparator 36, and when this voltage becomes higher than the negative-side potential it is input as a reset signal to the RS flip-flop 30 via the AND circuit 38 to which the output of the turn-on blanking pulse generator circuit 37 is also input, turning off the switching element 1. That is, by detecting the turn-on resistance of the switching element 1, the drain current is limited.

A voltage generated by the constant-current source 32 and P-type MOSFET 33, based on the output voltage VEAO internally converted by the I-V converter 21 corresponding to the current flowing from the clamping circuit 31 and control terminal 45, is applied to the negative side of the drain current detection comparator 36, so that the upper limit of the drain current (the maximum drain current) is limited by the clamping circuit 31, and the drain current of the switching element 1 can be changed through the level of the output voltage VEAO from the I-V converter 21. That is, the greater the increase in current flowing from the control terminal 45, the greater is the drop in output voltage VEAO of the I-V converter 21, so that the potential at the negative side of the drain current detection comparator 36 declines, and consequently the drain current of the switching element 1 decreases.

In this way, the voltage of the bias windings 103c of the transformer 103 is detected through the terminal 44 and the output voltage VEAO of the I-V converter 21, resulting from internal voltage conversion of the current at the control terminal 45; and by means of the output signal from the transformer reset pulse generator circuit 27, which generates a one-shot pulse due to the output of the transformer reset detection circuit 13 determining the turn-on timing of the switching element 1, the on/off interval of the switching element 1 is determined.

In this switching power supply device, a commercial alternating current is rectified by a diode bridge or other rectifier 101 and is smoothed by an input capacitor 102 to obtain a DC voltage VIN, which is applied to the power conversion transformer 103. The power conversion transformer 103 has primary windings 103a, secondary windings 103b, and tertiary windings (used as bias windings) 103c; the DC voltage VIN is applied to the primary windings 103a.

The DC voltage VIN applied to the primary windings 103a of the transformer 103 is switched by the switching element 1 within the semiconductor device for controlling switching power supply 46. Through the switching operation of the switching element 1, current is withdrawn from the secondary windings 103b of the transformer 103. The current withdrawn from the secondary windings 103b is rectified and smoothed by the diode 104 and capacitor 105 connected to the secondary windings 103b, and is supplied, as DC power at an output voltage $V_o$, to the load 109.

An output voltage detection circuit 106, comprising for example an LED 107 and Zener diode 108, is connected to both ends of the capacitor 105, and outputs a feedback signal to stabilize the output voltage $V_o$ to a primary-side phototransistor 110 connected to the control terminal 45 of the semiconductor device for controlling switching power supply 46.

The tertiary windings 103c of the transformer are connected to the bias windings voltage detection terminal 44 and, through the diode 112, to the start voltage detection terminal 43. The capacitor 111 is provided to keep the voltage at the terminal 43 from dropping sharply, that is, to stabilize the voltage; the resistor 116 and capacitor 117 connected to the terminal 44 are to generate a delay time, by which means the timing of transformer reset detection at the terminal 44 is adjusted. The capacitor 118 connected across input and output of the switching element 1 is provided to determine the magnitude and period of ringing due to resonance with the transformer 103.

Thus, by executing intermittent control during light loading, switching losses due to the switching element 1 can be suppressed, and the power supply efficiency for light loads can be improved; moreover, as shown in FIG. 1, after the current detection signal is received by the delay circuit 47 when switching is turned off, a fixed delay time is applied to the current detection signal by the delay circuit 47, so that switching turn-on control by the transformer reset pulse signal obtained by the transformer reset pulse detection circuit 27 based on the signal from the tertiary windings 103c of the transformer 103 is not accepted within a blanking time corresponding to the delay time, so that a turn-on signal is not applied to the switching element 1, and consequently switching by the switching element 1 is halted and the timing to turn on switching is delayed.

The operation under light loads of a semiconductor device for controlling switching power supply 46 and switching power supply device configured as described above is explained. The switching power supply device is a ringing choke converter (RCC) utilizing partial resonance operation, and is one configuration example used to explain this Embodiment 1.

Figure 3:
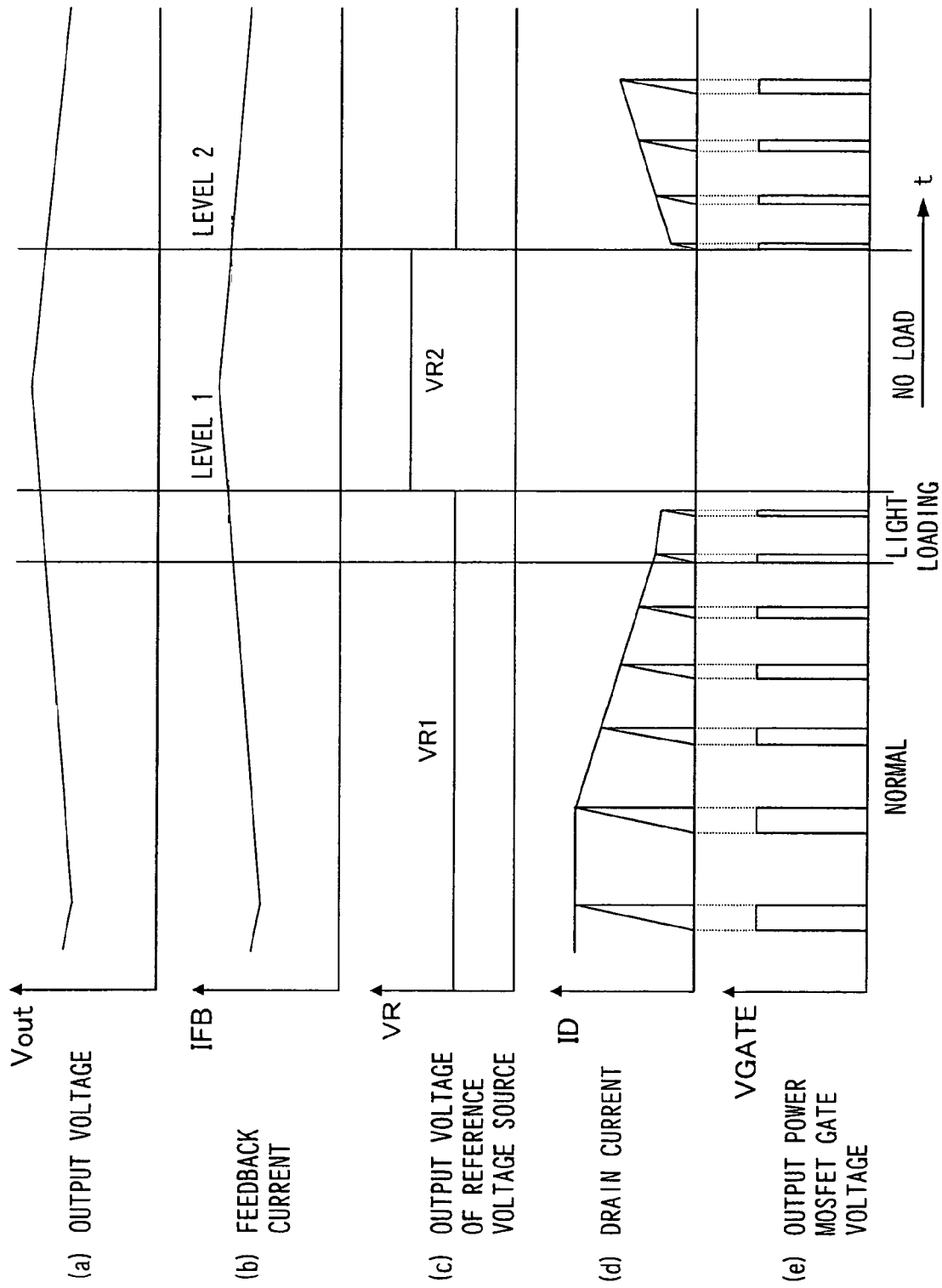
FIG. 3 is a timing chart used to explain operation of the semiconductor device for controlling switching power supply and of a switching power supply device comprising the semiconductor device for controlling switching power supply according to the Embodiment 1.
Figure 4:
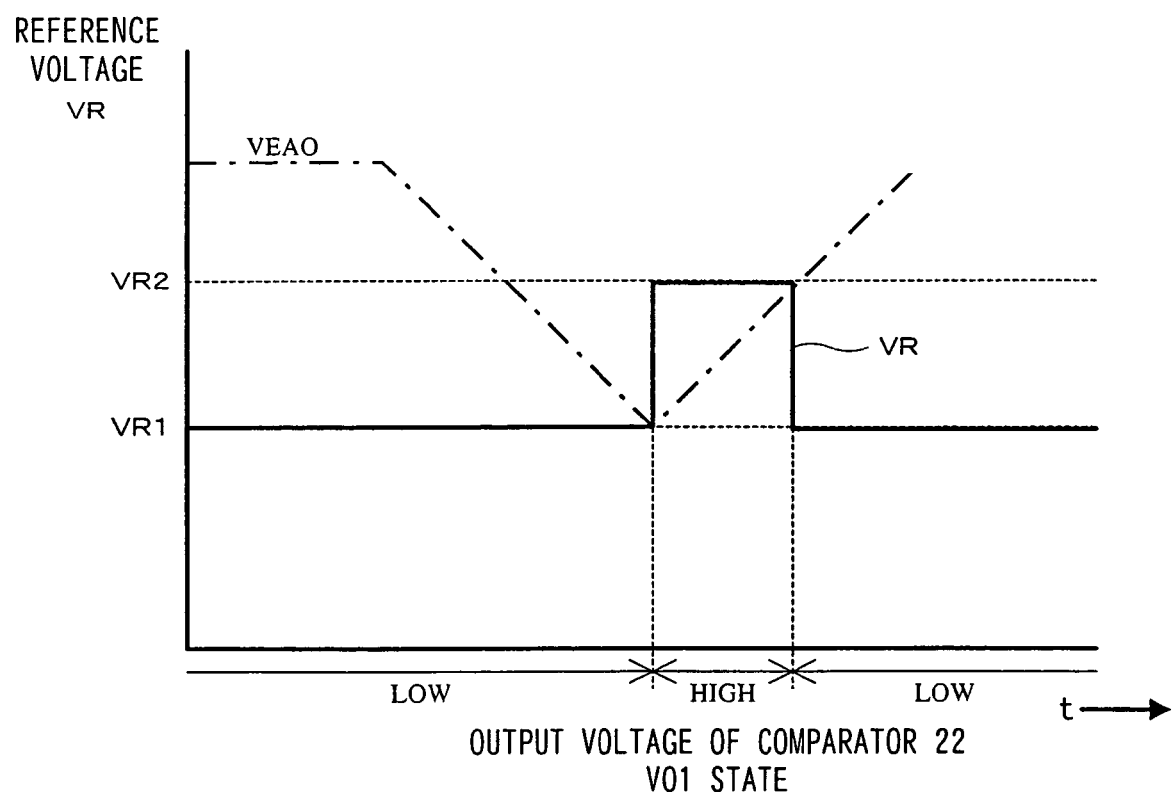
FIG. 4 is a timing chart used to explain operation of a reference voltage supply in the semiconductor device for controlling switching power supply according to the Embodiment 1.
Figure 5:
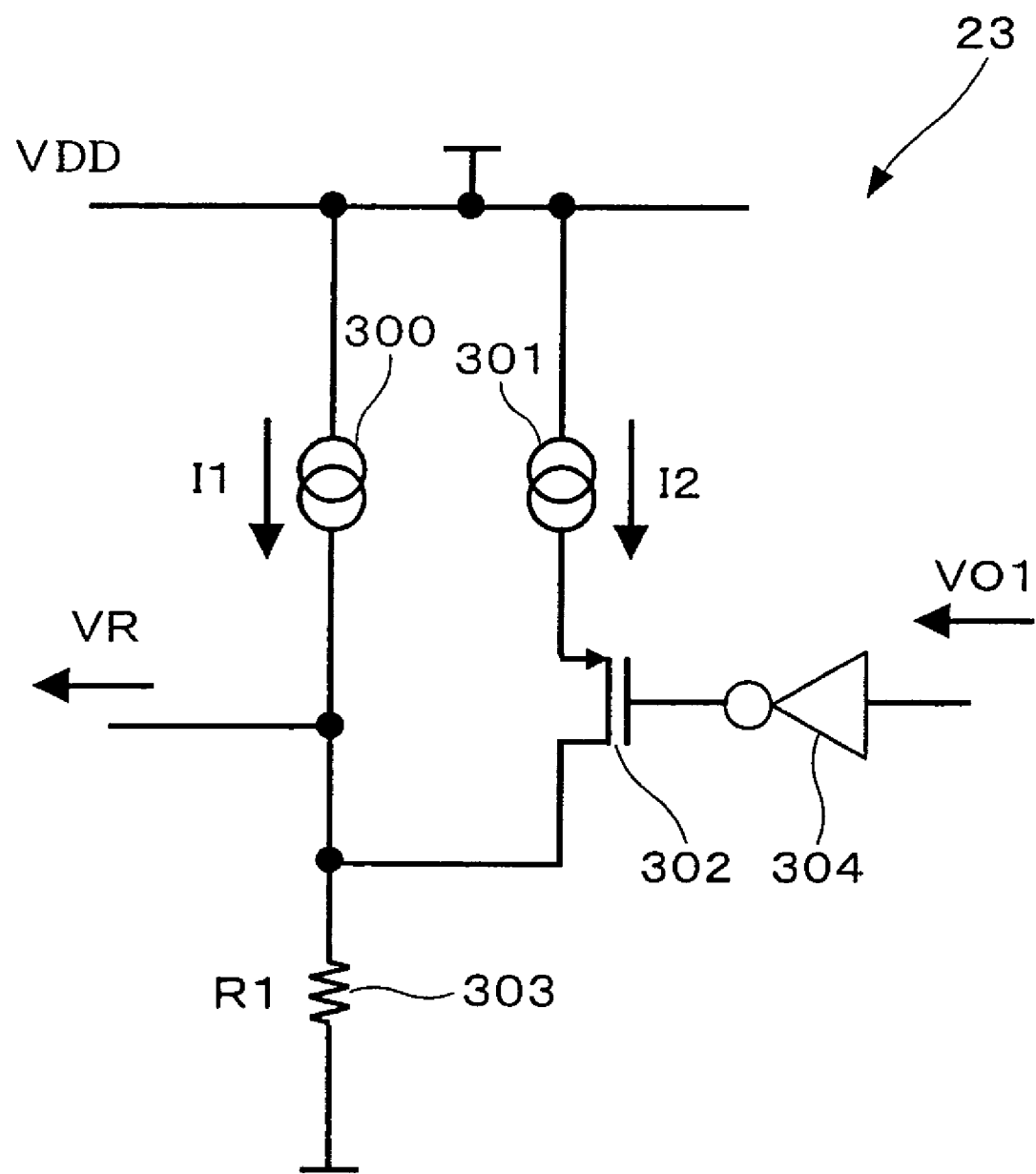
FIG. 5 is a circuit diagram showing one configuration example of the internal circuitry of the reference voltage supply in the semiconductor device for controlling switching power supply according to the Embodiment 1.

FIG. 3 is a timing chart used to explain operation of the semiconductor device for controlling switching power supply and of a switching power supply device comprising the semiconductor device for controlling switching power supply of this Embodiment 1. FIG. 4 is a timing chart used to explain operation of a reference voltage supply in the semiconductor device for controlling switching power supply of this Embodiment 1. And, FIG. 5 is a circuit diagram showing one configuration example of the internal circuitry of the reference voltage supply in the semiconductor device for controlling switching power supply of this Embodiment 1.

In FIG. 1 and FIG. 2, when an alternating current power supply from a commercial power supply is input to the rectifier 101, the current is rectified and smoothed by the rectifier 101 and the capacitor 102 and is converted into a DC voltage VIN. This DC voltage VIN is applied to the primary windings 103a of the transformer 103. When the DC voltage VIN becomes equal to or greater than a fixed value, a charging current flows into the capacitor 111 via the regulator 6 within the semiconductor device for controlling switching power supply 46, and when the voltage at the terminal 43 of the semiconductor device for controlling switching power supply 46 reaches a start voltage set by the start/stop comparator 7, control of the switching operation by the switching element 1 is begun.

A start pulse (startup pulse) is generated by the start pulse generator circuit 10 based on the output signal from the start/stop comparator 7, and the switching element 1 is turned on. The secondary-side output is low at the time of startup, so that no current flows in the Zener diode 108 of the output voltage detection circuit 106, and consequently no current flows in the phototransistor 110. Hence the output voltage VEAO of the I-V converter 21 is at a higher level than the clamping circuit 31, and the negative side of the drain current detection comparator 36 is set to a voltage determined by the clamping circuit 31. A start pulse is generated by the start pulse generator circuit 10, and when the switching element 1 is turned on current flows in the switching element 1, and the turn-on voltage, which is the product of the current and the turn-on resistance, is applied to the positive side of the drain current detection comparator 36; when this voltage rises to be equal to or greater than the voltage determined by the negative side, H is input as the reset terminal signal of the RS flip-flop 30, and the switching element 1 is turned off.

Thereafter, when the voltage across the tertiary windings (bias windings) 103c of the transformer 103 changes from positive to negative due to resonance operation determined by the inductance of the transformer 103 and by the capacitor 118 and the input/output capacitance of the switching element 1, that is, when the voltage of the input terminal 41 of the switching element 1 falls, the transformer reset detection circuit 13 causes a one-shot pulse signal from the transformer reset pulse generator circuit 27 to pass through the OR circuit 29 and cause H to be input to the set terminal of the RS flip-flop 30, so that the switching element 1 is turned on.

The detection time of the transformer reset detection circuit 13 is adjusted by means of the resistor 116 and capacitor 117 connected between the tertiary windings (bias windings) 103c of the transformer 103 and the terminal 44, so that when the voltage at the input terminal 41 of the switching element 1 is substantially zero volts, the switching element 1 is turned on.

The above switching operation is repeated, and the output voltage $V_o$ rises, but upon becoming equal to or greater than the voltage set by the output voltage detection circuit 106, the LED 107 becomes conducting, current flows in the phototransistor 110, and current flows from the control terminal 45 of the semiconductor device for controlling switching power supply 46. The output voltage VEAO of the I-V converter 21 declines according to the magnitude of this outflowing current, so that the negative side of the drain current detection comparator 36 is lowered, and the drain current of the switching element 1 is reduced. Thus, the on duty of the switching element 1 changes to an appropriate state. That is, switching is turned on by a one-shot pulse from the transformer reset pulse generator circuit 27 due to the output signal from the transformer reset detection circuit 13, and the on duty of the switching element 1 is determined by the current flowing from the control terminal 45.

Figure 6:
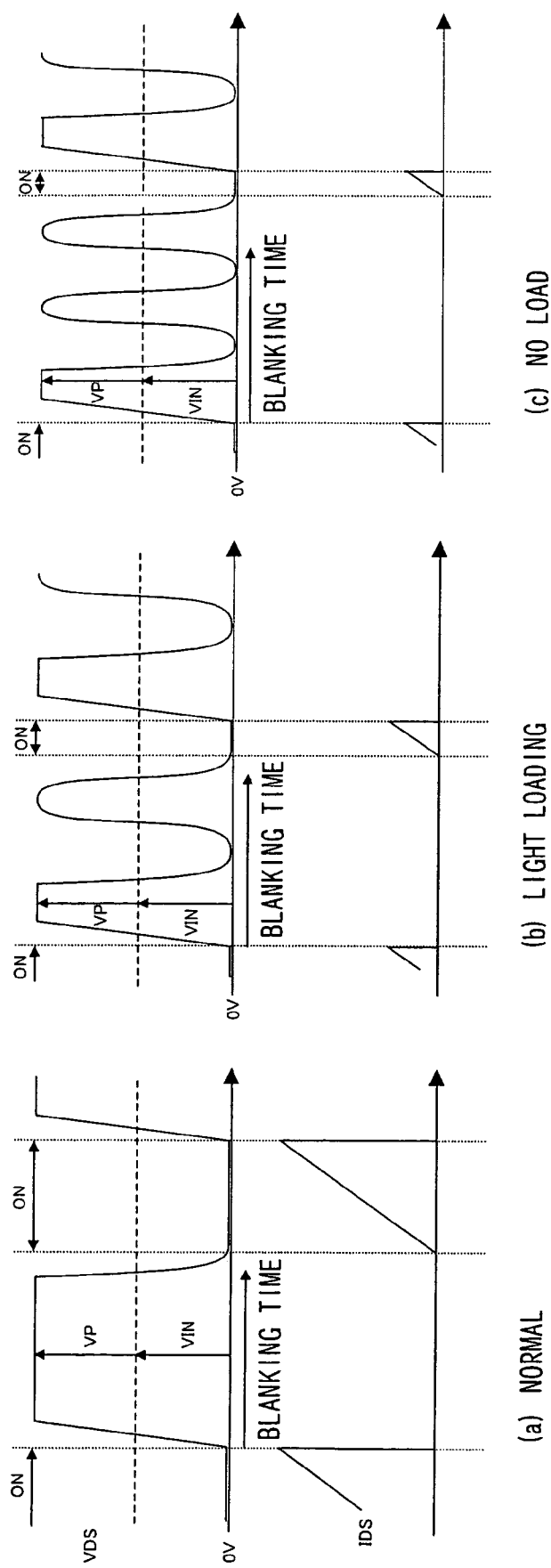
FIG. 6 is a waveform diagram showing switching operation in the semiconductor device for controlling switching power supply according to the Embodiment 1.

In other words, as shown in FIG. 6, during light loading when the current supplied to the load 109 is small the interval during which the current IDS flows to the switching element 1 is shortened, and during heavy loading such as in normal operation the interval during which the current IDS flows to the switching element 1 is lengthened.

Thus, the semiconductor device for controlling switching power supply 46 controls the drain current IDS of the switching element 1 according to the power supplied to the load 109 of the switching power supply, to execute control in which the on duty is changed. Further, the timing with which the switching element 1 is turned on is set so that output occurs when the input voltage of the switching element 1 during resonant operation is lowest, and therefore there are almost no switching losses when turned on. That is, partial resonance operation is performed such that switching losses while turned on can be ignored. By means of this operation, efficiency during normal operation can be increased, and noise can be reduced.

Next, the light-loading detection comparator 22 compares the output voltage VEAO resulting from voltage conversion by the I-V converter 21 of the current flowing from the control terminal 45 with the output voltage VR of the reference voltage supply 23. The output voltage VR of the reference voltage supply 23 is initially (the "normal" in FIG. 3) the light-loading detection lower limit voltage VR1. In cases such as standby (the load fluctuation state in FIG. 3) in which current supplied to the load 109 connected to the switching power supply output is small, as the current supplied to the load falls the output voltage $V_o$ rises, and the current in the phototransistor 110 due to the LED 107 increases. Because the current flowing from the control terminal 45 due to this current increases, the converted voltage VEAO of the I-V converter 21 declines according to equation (1).

$$VEAO = V0 - R \times 1 \qquad (1)$$

Here V0 is the reference voltage of the reference voltage supply 20, set in advance, R is the resistance value of the resistor 19, and I is the value of the current flowing in the resistor 19, resulting by conversion of the current flowing from the control terminal 45 by the mirror circuits 15 to 18.

Hence from equation (1), the more the current flowing from the control terminal 45 increases, the more the output voltage VEAO of the I-V converter 21 falls. This is accompanied by a drop in the reference voltage supply (negative side) of the drain current detection comparator 36, and as the drain current of the switching element 1 gradually declines the power supplied to the load 109 decreases. When the converted voltage VEAO of the I-V converter 21 becomes smaller than the light-loading detection lower limit voltage VR1, the light-loading detection state is entered, and as shown in FIG. 4, the output signal VO1 from the light-loading detection comparator 22 changes from low level to high level.

As a result, the output of the AND circuit 26 via the inverter 25 drops to low level, and a one-shot pulse signal is not output from the transformer reset pulse generator circuit 27, so that switching operation of the switching element 1 is halted. Also at this time ("no load" in FIG. 3), the output signal VO1 of the light-loading detection comparator 22 is received, and the output voltage VR of the reference voltage supply 23 is changed from the light-loading detection lower limit voltage VR1 to the light-loading detection upper limit voltage VR2.

When switching operation by the switching element 1 is halted and the switching element 1 enters the off state, a state is entered in which current does not flow in the switching element 1. As a result, power is no longer supplied to the load 109, and so the output voltage $V_o$ to the load 109 gradually declines. Consequently the output voltage VEAO of the I-V converter 21 gradually rises; but because the output voltage of the reference voltage source 23 is at the light-loading detection upper limit voltage VR2 which is higher than the light-loading detection lower limit voltage VR1, switching operation of the switching element 1 is not resumed immediately, as shown in FIG. 4.

As shown in FIG. 3, the output voltage $V_o$ to the load 109 further declines, and when the output voltage VEAO of the I-V converter 21 has risen above the light-loading detection upper limit voltage VR2 as shown in FIG. 4, the output signal VO1 of the light-loading detection comparator 22 goes to low level, the signal of the comparator 22 passes through the inverter 25 to be received by the intermittent end pulse generator circuit 28, which outputs a signal. By means of this signal, switching operation by the switching element 1 is resumed. At the same time, the transformer reset detection circuit 13, operation of which had been halted by the AND circuit 26, becomes active, and a one-shot pulse output signal from the transformer reset pulse generator circuit 27 causes resumption of normal partial-resonance on-off operation of the switching element 1 (the same state as during normal operation in FIG. 3).

At the same time, as shown in FIG. 4, the output voltage VR from the reference voltage source 23 changes from the standby (light loading) detection upper limit voltage VR2 to the standby (light loading) detection lower limit voltage VR1. When switching operation by the switching element 1 resumes, the on duty of the switching element 1 is broader than the on duty for light loading detection, so that power supplied to the load 109 becomes excessive, the output voltage $V_o$ to the load again rises, and the output voltage VEAO of the I-V converter 21 falls. When light loading is again detected, switching operation through repeated on-off action of the switching element 1 is halted.

In this way, the output voltage VR from the reference voltage source 23 is changed from the light-loading detection lower limit value VR1 to the light-loading detection upper limit value VR2 as a result of light loading detection, so that while standby is detected an intermittent oscillation state (intermittent switching state) continues in which switching control, in which operation of the switching element 1 is repeatedly turned on and off, is repeatedly halted and resumed.

The output voltage $V_o$ to the load 109 declines during the halt periods of this intermittent oscillation, but the extent of this decline depends on the current supplied to the load 109. That is, the smaller the current consumed by the load 109, the more gradual is the decline in output voltage $V_o$ to the load 109, and the smaller the current consumed by the load 109, the longer is the halt period of intermittent oscillation; hence the lighter the load, the more switching operation by the switching element 1 is reduced.

The reference voltage source 23 shown in FIG. 5 comprises a constant-current source 300, constant-voltage source 301, and resistance 303 to determine the output voltage VR of the reference voltage source 23, as well as a p-type MOSFET or other switching element 302 and inverter circuit 304.

The constant-current source 300 supplies a constant current I1, and is connected to the resistor 303. The constant-current source 301 supplies a constant current I2, and is connected via the switching element (p-type MOSFET) 302 to the resistor 303. The output signal VO1 of the light-loading detection comparator 22 is input, through the inverter circuit 304, to the gate or other input terminal of the switching element 302. The voltage created by the constant-current source 300, constant current source 301, and resistance 303 is output as the output voltage VR of the reference voltage source 23, and is input to the positive-side terminal of the light-loading detection comparator 22.

The operation of a light-loading detection circuit 24 configured in this way is explained below.

As shown in FIG. 4, in the state prior to light loading detection, the output signal VO1 of the light-loading detection comparator 22 is at low level (LOW), so that the switching element 302 is turned off. Hence at this time the output signal VR of the reference voltage source 23, that is, the light-loading detection lower limit voltage VR1, is as given by equation (2).

$$VR1 = R1 \times (I1) \qquad (2)$$

On the other hand, in the light-loading detection state the output signal VO1 of the light-loading detection comparator 22 is at high level (HIGH), so that the switching element 302 is turned on, and the current I2 supplied by the fixed current source 301 also flows to the resistance 303. Hence the output signal VR of the reference voltage source 23 at this time, that is, the light-loading detection upper limit voltage VR2, is given by equation (3).

$$VR2 = R1 \times (I1 + I2) \qquad (3)$$

Thus, as indicated in FIG. 4, the output voltage VR of the reference voltage source 23 becomes either the light-loading detection lower limit voltage VR1 or the light-loading detection upper limit voltage VR2 according to the output signal VO1 of the light-loading detection comparator 22, so that an intermittent oscillation state can be created during standby.

In this Embodiment 1, the fixed current value to set the output voltage of the reference voltage source 23 is changed according to the output signal VO1 of the light-loading detection comparator 22; however, the resistance value for output voltage setting of the reference voltage source 23 may instead be changed according to the output signal VO1 of the light-loading detection comparator 22.

Next, FIG. 6 and FIG. 7 are used to explain a configuration example and the operation of the delay circuit 47.

Figure 8:
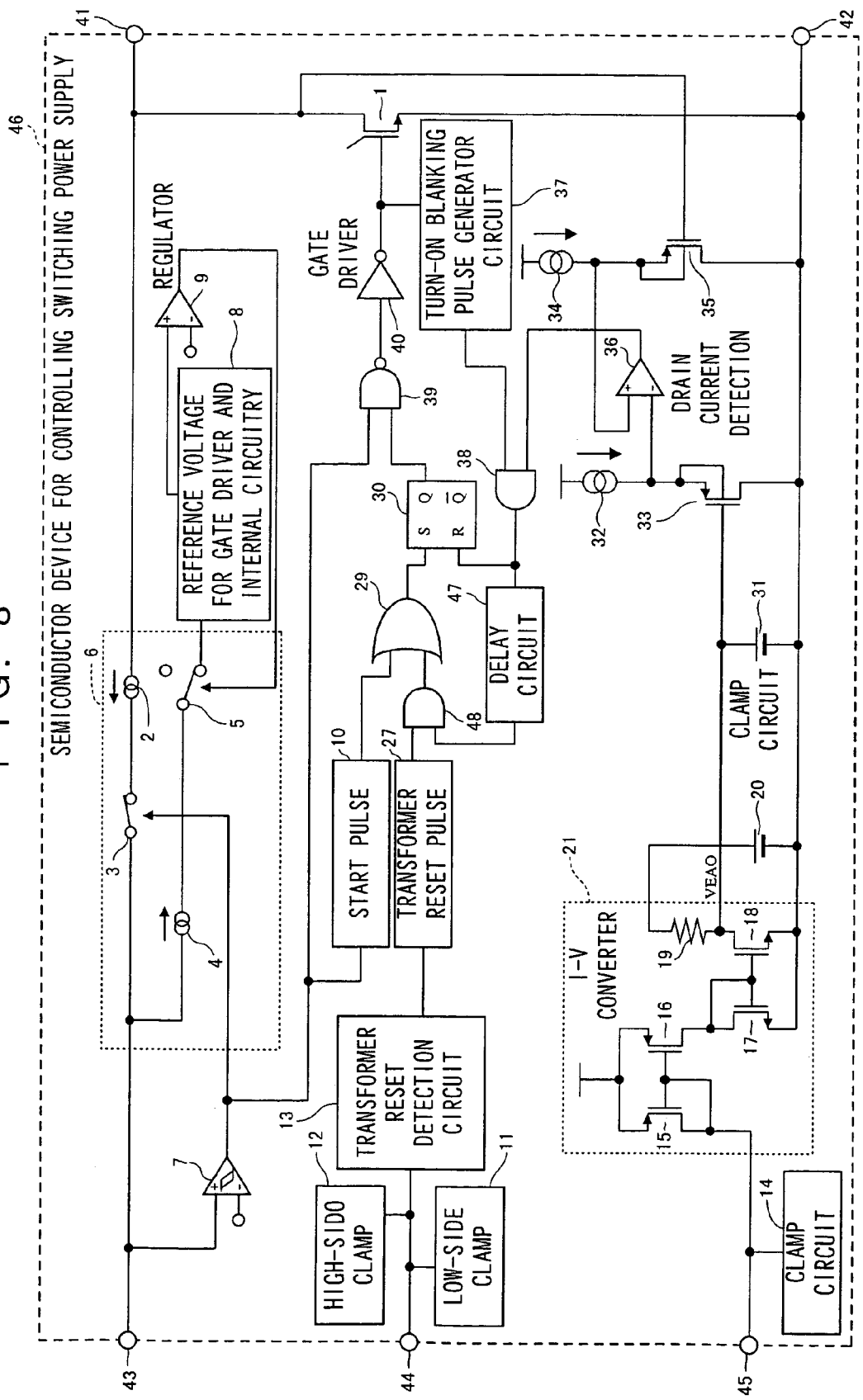
FIG. 8 is a circuit diagram showing another configuration example of the semiconductor device for controlling switching power supply according to the Embodiment 1.

FIG. 6 is a waveform diagram showing switching operation in the semiconductor device for controlling switching power supply of this Embodiment 1. FIG. 7 is a circuit diagram showing one configuration example of the delay circuit in the semiconductor device for controlling switching power supply of this Embodiment 1. FIG. 8 is a circuit diagram showing another configuration example of the semiconductor device for controlling switching power supply of this Embodiment 1.

Figure 16:
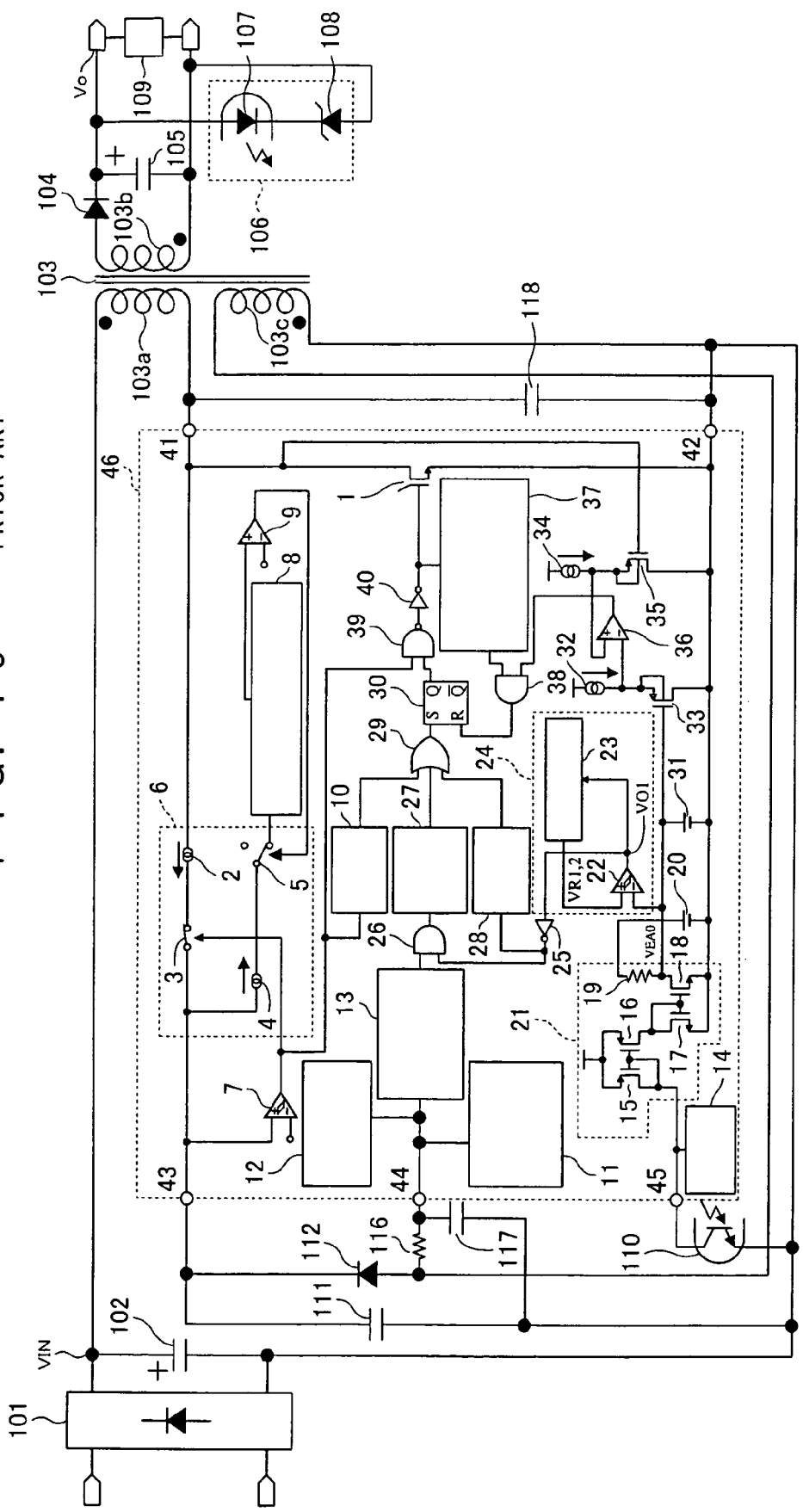

In FIG. 1 and FIG. 2, a delay circuit 47 is added to the conventional configuration example shown in FIG. 16; the meaning of this provision of a delay circuit 47 is explained below.

First, limitation of the maximum frequency is explained.

Quasi-resonance is due to a RCC (ringing choke converter); in essence operation entails self-excitation, so that the lighter the load, the higher is the oscillation frequency.

In a power supply strict measures to limit noise are taken, and if the oscillation frequency is 150 kHz or higher, high-frequency noise appears. This high-frequency noise is radio noise which is generally a problem in the frequency range (150 kHz to 1 GHz) which generally causes electromagnetic disturbance. This noise can be broadly divided into propagating noise which travels over power lines and similar, and radiation noise which is radiated into space.

In light of this, the maximum frequency is limited in order that the oscillation frequency under light loading will not rise so high as to enter the frequency range in which high-frequency noise occurs.

Next, improvement of the power supply efficiency under light loading through reduction of switching losses is explained.

As the oscillation frequency rises during light loading, the number of switching operations per unit time increases. Hence switching losses accompanying switching increase, and so in order to reduce losses, the frequency is limited so as not to rise above a fixed value.

In the above delay method, when an off signal is output to the switching element (a power MOSFET) 1, that is, after drain current detection is performed through the turn-on resistance of the switching element (power MOSFET) 1 according to the load, a delay circuit 47 is inserted between this signal and the AND circuit 48, one input of which is the transformer reset pulse signal. The turn-on signal from the transformer reset pulse generator circuit 27 is ANDed with the turn-off signal due to drain current detection, that is, if while turned off based on the drain current detection state a transformer reset pulse signal (turn-on signal) is input, the signal is output, so that if a turn-off signal due to drain current detection is input to the AND circuit 48, even if a transformer reset pulse signal is input the switching element (power MOSFET) 1 is not turned on.

From the above, if a certain fixed time delay is applied by a delay circuit 47 to the turn-off signal due to drain current detection, even if a transformer reset pulse signal (turn-on signal) is output to the AND circuit 48 during this delay period, the switching element (power MOSFET) 1 is not turned on; hence if this delay time (that is, time for masking the turn-on state due to a transformer reset pulse signal) is decided, even if a transformer reset detection signal is input in a shorter time than this delay time, the switching element (power MOSFET) 1 is not turned on.

As the oscillation frequency rises during light loading in actual operation, if the mask time is inserted after the transformer reset detection signal, ringing is skipped once, and switching is turned on at the next transformer reset detection signal. In this way the above advantageous results are obtained.

Next, FIG. 6 is used to explain the semiconductor device for controlling switching power supply 46 having a delay circuit 47 as shown in FIG. 1 and FIG. 2, for the separate cases of a normal load state, light loading, and a no-load state.

As shown in FIG. 6, as the load lessens from a normal load state ((a) in FIG. 6) to a light load state ((b) in FIG. 6), and then to a no-load state ((c) in FIG. 6), the oscillation frequency should rise; but within the blanking time which is the delay time of the delay circuit 47 for masking transformer reset pulse signals having a waveform timing corresponding to the waveform of the drain voltage VDS of the switching element (power MOSFET) 1, the switching element (power MOSFET) 1 is not turned on and a drain current IDS does not flow, and so the switching frequency does not rise above a certain fixed frequency.

That is, when the load state is light loading, the shorter the period of the transformer reset pulse signal to turn on the switching element (power MOSFET) 1, the greater the increase in the number of skips due to the blanking time in the timing to turn on the switching element (power MOS-FET) 1 in the transformer reset pulse signal waveform corresponding to the drain voltage VDS of the switching element (power MOSFET) 1, as shown in (b) and (c) of FIG. 6. Consequently, even if the drain voltage VDS goes to 0V during this interval, a drain current IDS does not flow, and the oscillation frequency in switching does not rise above a certain fixed value.

Next, FIG. 7 is used to explain one configuration example of the delay circuit 47.

In the delay circuit 47 shown in FIG. 7, a signal to turn off the switching element (power MOSFET) 1 is received, and when H level is input as the drain current detection signal the n-channel MOSFET 901 is turned on, so that charge is removed from the capacitance C, which has been charged to level VDD in the initial state, in a fixed current I. That is, the capacitance C discharges a fixed current I, and when the potential across the capacitance C falls below the threshold value of the inverter 902 and goes to L level, the blanking time which masks the output is canceled and the output blanking cancel signal goes to H level.

This mask time t is determined by t=CV/I, where V is determined by the voltage VDD minus the threshold voltage of the inverter 902. For example, if I=1 µA, C=3 pF, and V=2.8 V, then the delay time is t=8.4 µs.

Thus, high-frequency operation during light loading can be suppressed to reduce switching losses and improve the light-loading power supply efficiency, so that power consumption under light loading can be reduced; in addition, quasi-resonant operation means that higher efficiency and lower noise can easily be realized over the entire range of loads during normal operation as well, from light to heavy loading.

In the above, as shown in FIG. 1, a case was explained in which a configuration is adopted using a light-loading detection circuit 24 such that switching operation by the switching element is intermittent switching operation under light loading, with a delay circuit 47 employed. But as shown in FIG. 8, when a configuration not using a light-loading detection circuit 24 is employed, with intermittent switching operation not performed by the switching element, in a similar implementation with similar advantageous results obtained.

(Embodiment 2)

The semiconductor device for controlling switching power supply of Embodiment 2 of the invention is explained.

Figure 9:
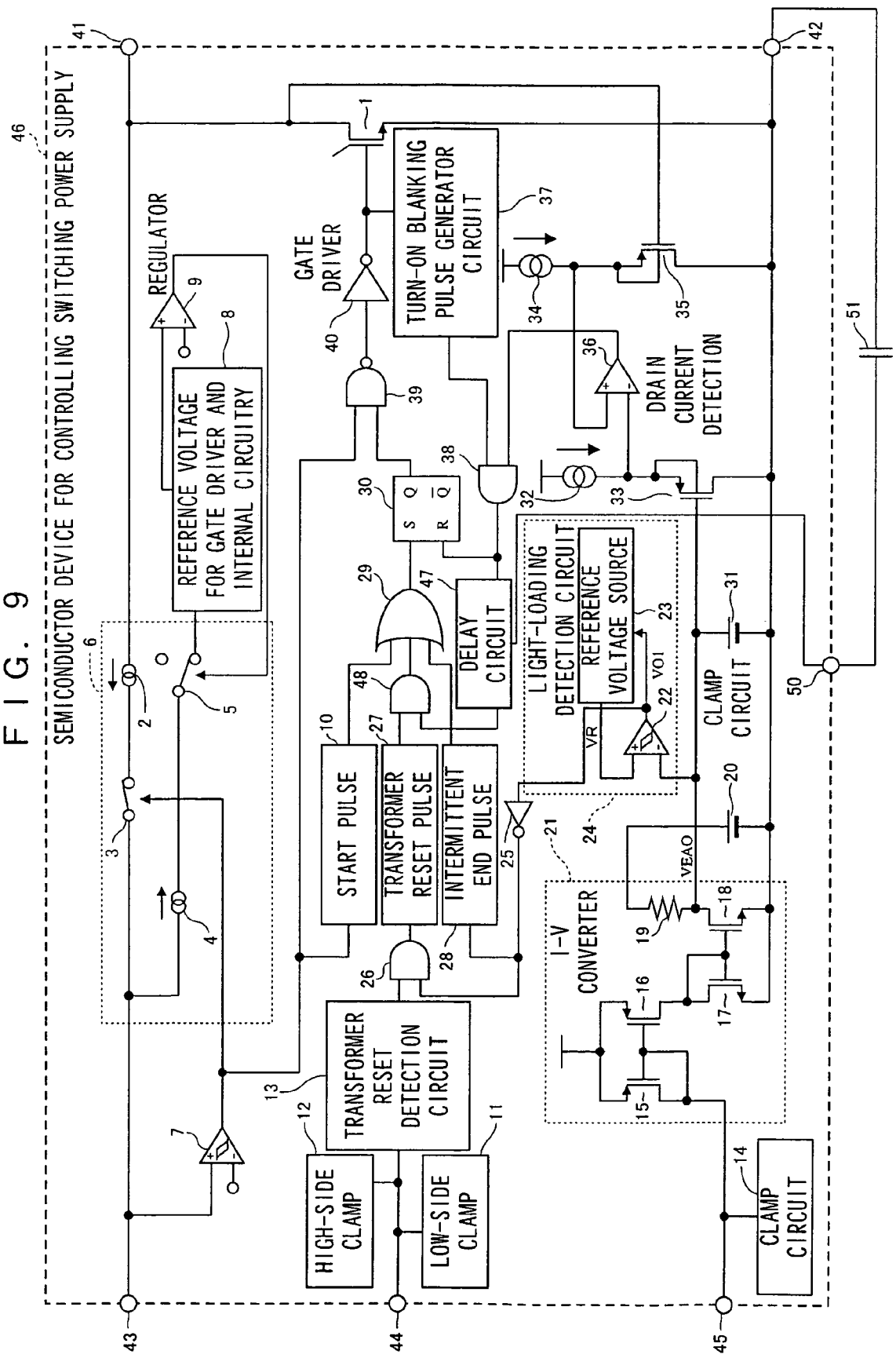
FIG. 9 is a circuit diagram showing one configuration example of a semiconductor device for controlling switching power supply according to Embodiment 2 of the invention.
Figure 10:
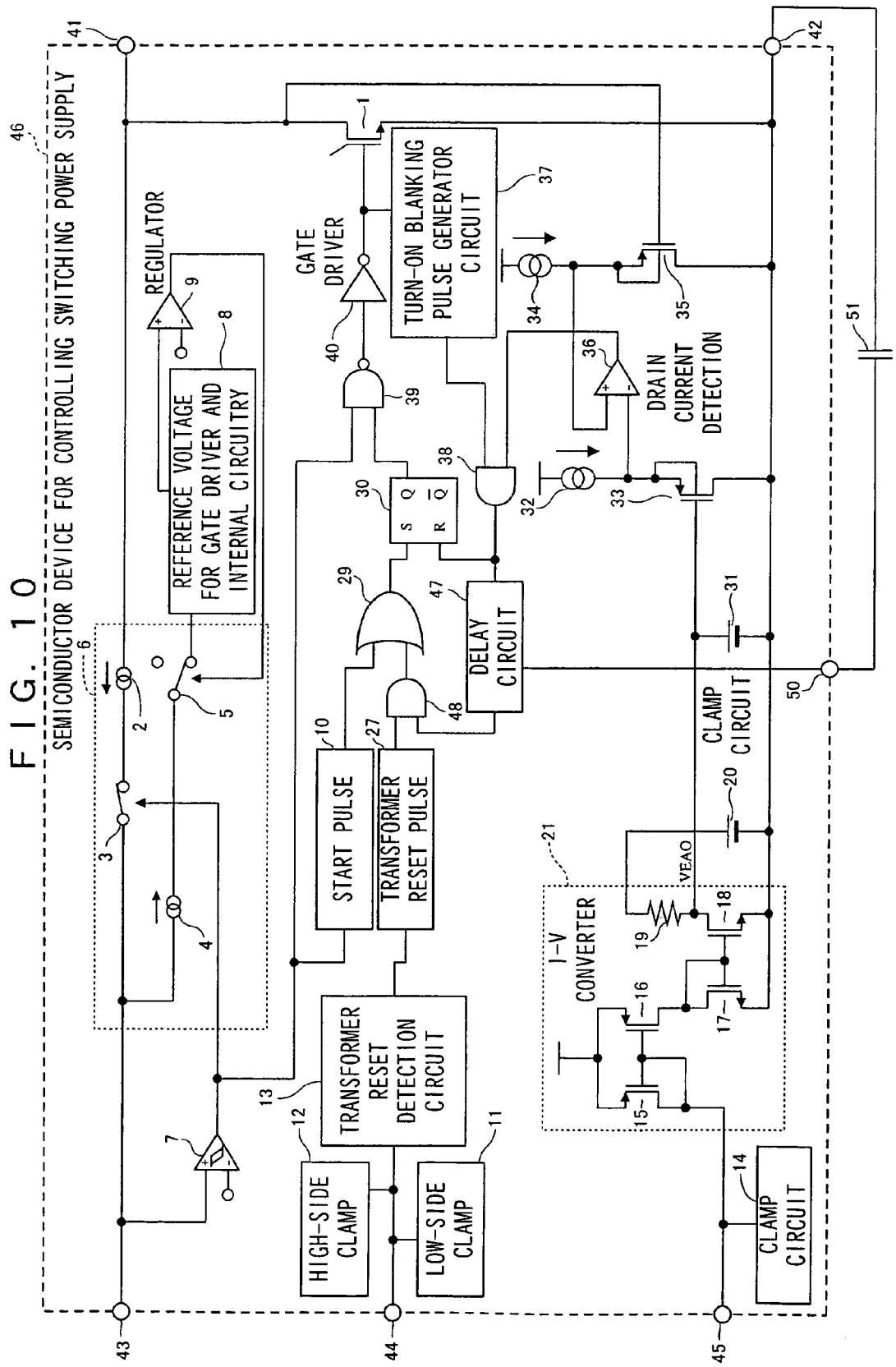
FIG. 10 is a circuit diagram showing another configuration example of the semiconductor device for controlling switching power supply according to the Embodiment 2.

FIG. 9 is a circuit diagram showing one configuration example of a semiconductor device for controlling switching power supply of Embodiment 2. FIG. 10 is a circuit diagram showing another configuration example of the semiconductor device for controlling switching power supply of this Embodiment 2.

In the semiconductor device for controlling switching power supply 46, as shown in FIG. 9, a terminal 50 connected to the delay circuit 47 is provided, and a capacitor 51 is connected externally between this terminal 50 and a terminal (ground, GND) 42.

In this configuration, the capacitor 51 connected externally between the terminal 50 and the terminal 42 is used as the charging capacitance C of the delay circuit 47 shown in FIG. 7.

In this case also, an advantageous result similar to that of the semiconductor device for controlling switching power supply of Embodiment 1 is obtained, and because a configuration is employed in which the capacitor 51 can be connected externally to the semiconductor device for controlling switching power supply 46 as the charging capacitor C, the blanking time of the delay circuit 47 can be changed and adjusted as appropriate.

In the above, as shown in FIG. 9, by using a light-loading detection circuit 24 in which the switching operation of the switching element is intermittent switching operation during light loading, a case was explained in which the charging capacitor C of the delay circuit 47 of FIG. 7 is connected as the capacitor 51 externally to the semiconductor device for controlling switching power supply 46; but as shown in FIG. 10, a configuration may be employed not using a light-loading detection circuit 24, and with intermittent switching not performed by the switching element, but in a similar implementation with similar advantageous results obtained.

(Embodiment 3)

The semiconductor device for controlling switching power supply of Embodiment 3 of the invention is explained.

Figure 11:
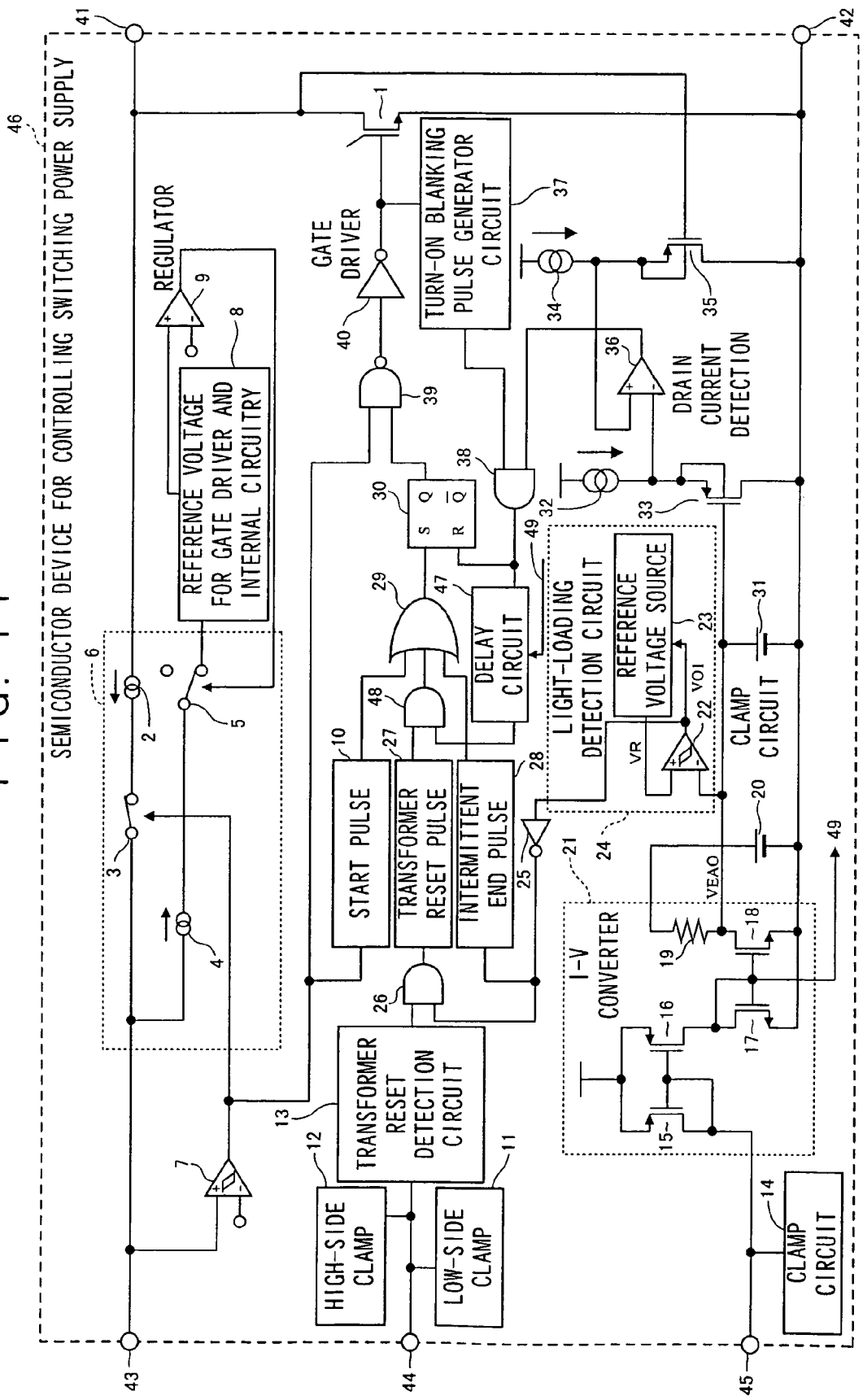
FIG. 11 is a circuit diagram showing one configuration example of a semiconductor device for controlling switching power supply according to Embodiment 3 of the invention.
Figure 12:
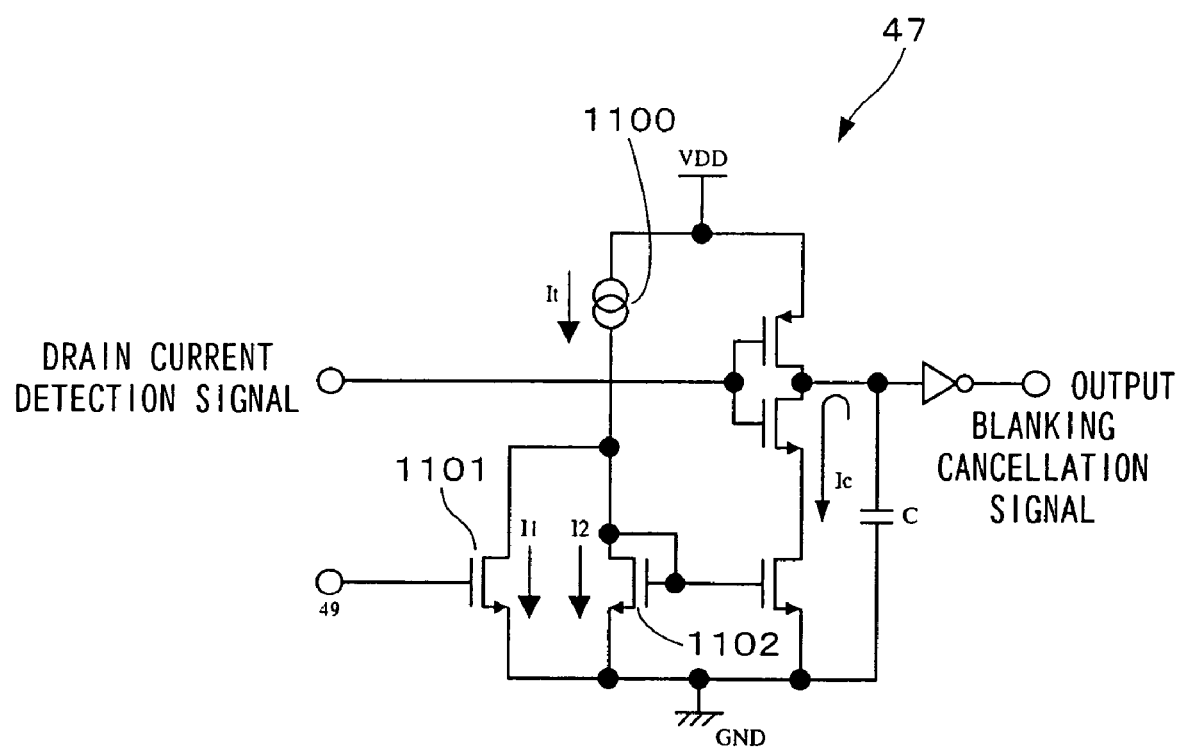
FIG. 12 is a circuit diagram showing one configuration example of the delay circuit in the semiconductor device for controlling switching power supply according to the Embodiment 3.
Figure 13:
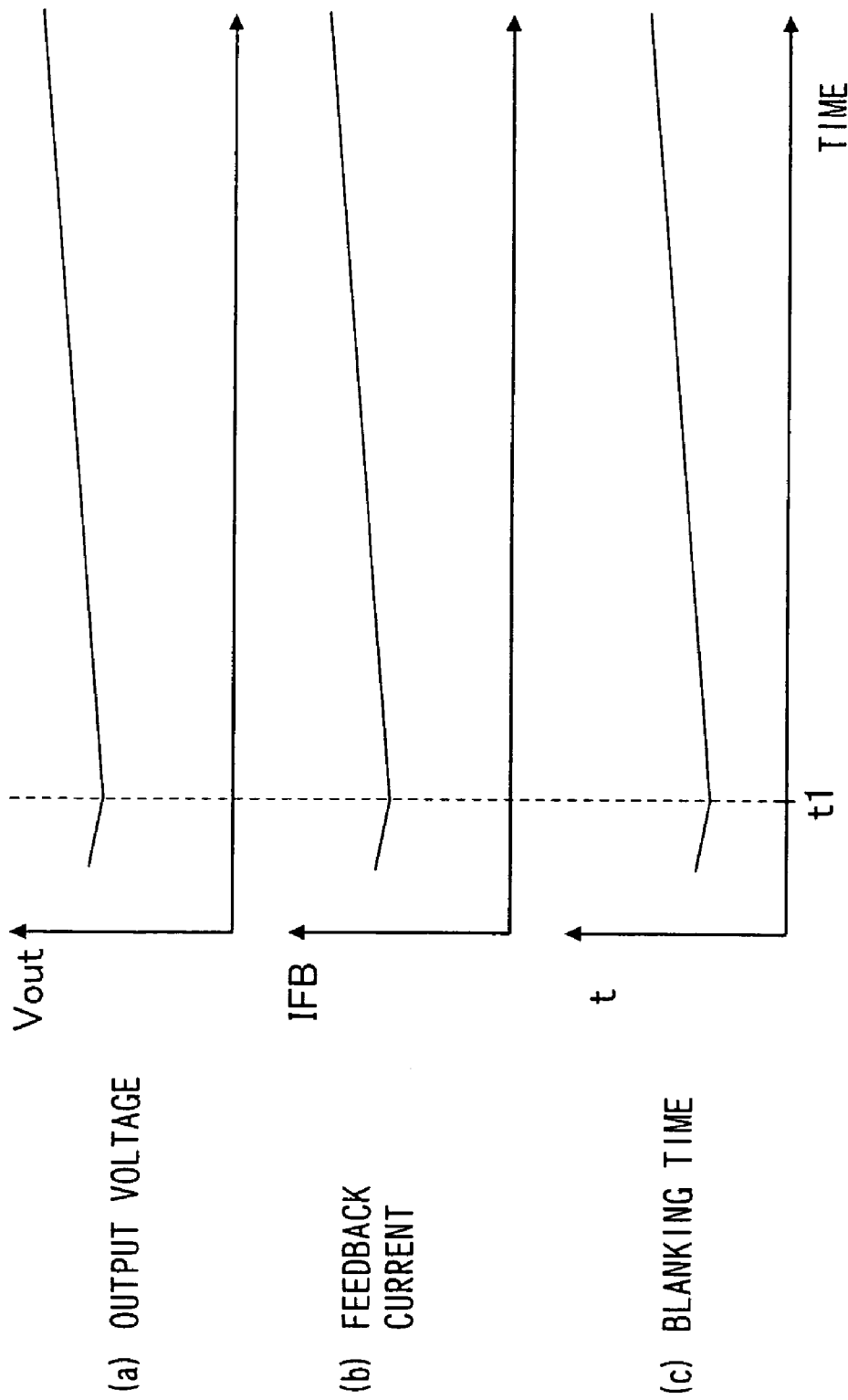
FIG. 13 is a waveform diagram showing operation in the delay circuit in the semiconductor device for controlling switching power supply according to the Embodiment 3.
Figure 14:
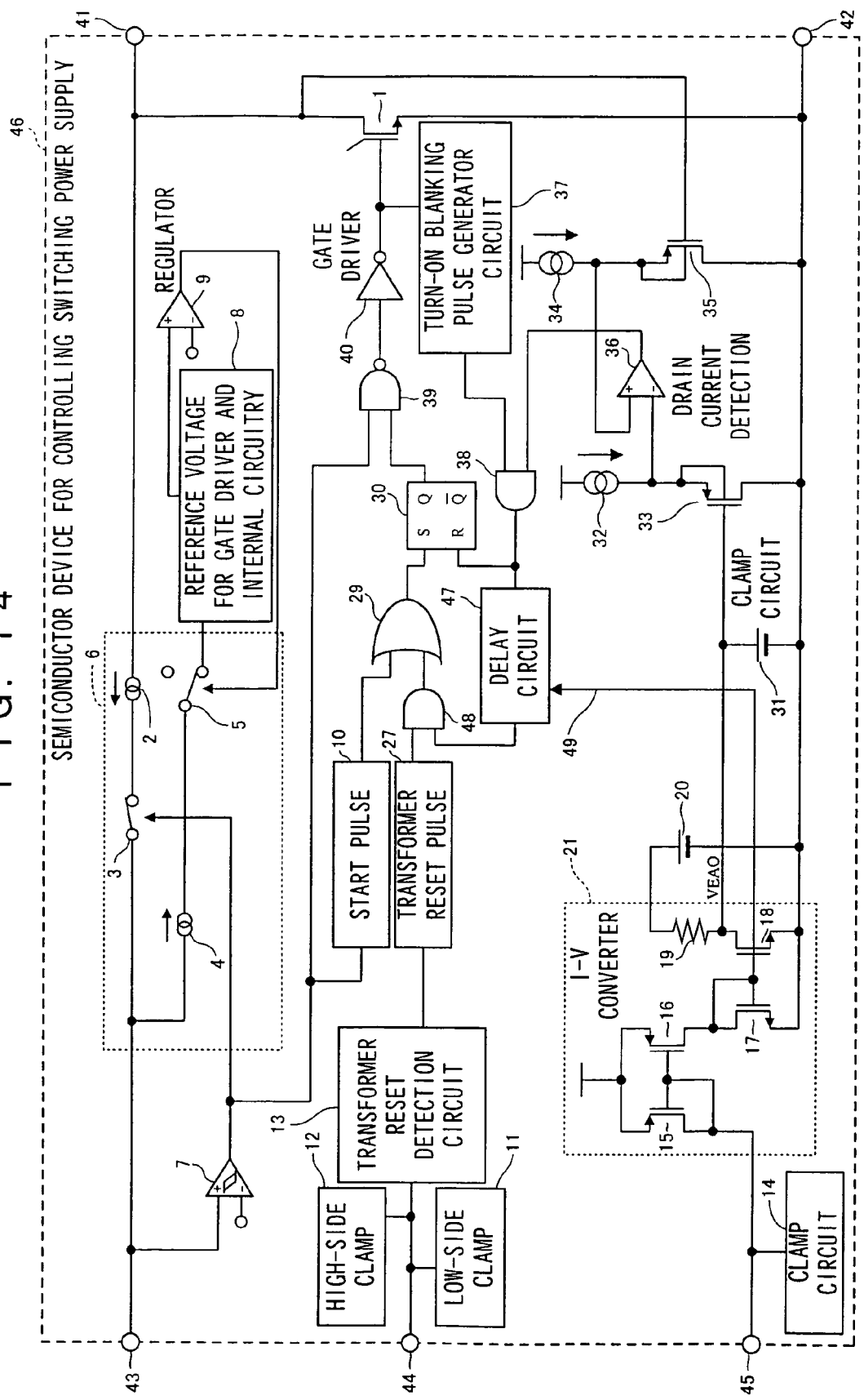
FIG. 14 is a circuit diagram showing another configuration example of the semiconductor device for controlling switching power supply according to the Embodiment 3.

FIG. 11 is a circuit diagram showing one configuration example of a semiconductor device for controlling switching power supply of Embodiment 3 of the invention. FIG. 12 is a circuit diagram showing one configuration example of the delay circuit in the semiconductor device for controlling switching power supply of this Embodiment 3. FIG. 13 is a waveform diagram showing operation in the delay circuit in the semiconductor device for controlling switching power supply of this Embodiment 3. And, FIG. 14 is a circuit diagram showing another configuration example of the semiconductor device for controlling switching power supply of Embodiment 3.

FIG. 11 shows an example in which the delay circuit 47 in the semiconductor device for controlling switching power supply of Embodiment 1 shown in FIG. 1 is configured such that the delay time is automatically changed from the I-V converter 21 through the node 49, according to the loading state detected at the control terminal 45. Current is drawn by mirror circuits comprised by p-type MOSFETs 15, 16, an n-type MOSFET 17, and the n-type MOSFET 1101 shown in FIG. 12, according to the current flowing from the control terminal 45 which changes with the loading state; as loading becomes lighter and more current is drawn, the delay time due to the delay circuit 47 via the node 49 becomes longer.

FIG. 12 is an example of the configuration of a delay circuit 47 when the delay time of the delay circuit 47 in FIG. 11 is changed linearly with changes in the load; the node 49 in FIG. 11 is connected to the gate of an n-type MOSFET 1101. In this configuration, the relations between the fixed current It from the fixed current source 1100, the current I1 in the n-type MOSFET 1101, the current I2 in the n-type MOSFET 1102, and the discharge current Ic from the capacitance C are $$It(\text{fixed}) = I1 + I2$$

$$I2 = It(\text{fixed}) - I1 = Ic$$

The remainder after subtracting the current I1 in the n-type MOSFET 1101 from the fixed current It is the current I2 in the n-type MOSFET 1102, and the current Ic obtained as a mirror of this is the discharge current from the capacitance C, the discharge time of which determines the delay time of the delay circuit 47. In this case, as the feedback current IFB from the control terminal 45 increases the current I1 increases, the current I2 decreases, and the current Ic with the same value also decreases, so that the discharge time from the capacitance C is lengthened and the delay time is also lengthened.

Hence as shown in FIG. 13, when at time t1 the load lightens and the output voltage Vout rises the feedback current IFB increases, and as this feedback current IFB increases and the current I1 increases the current I2 decreases and the current Ic also decreases, so that the discharge time from the capacitance C is lengthened and the delay time is lengthened, and the blanking time t is also lengthened.

Thus, the blanking time to delay the start of turn-on of the switching element (power MOSFET) 1 by the transformer reset detection signal can be changed automatically according to the loading state, so that the lighter the loading the lower is the maximum frequency, switching losses in the switching element (power MOSFET) 1 can be suppressed, and in particular there is the substantial advantageous result that switching losses under light loading are suppressed.

In the above, as shown in FIG. 11, a case was explained for a configuration in which, by using the light-loading detection circuit 24 the switching operation of the switching element 1 during light loading becomes intermittent switching operation, and a delay circuit 47 is provided such that the delay time of this delay circuit 47 is changed automatically from the I-V converter 21 via the node 49 according to the loading state detected at the control terminal 45. But as shown in FIG. 14, even in a configuration which does not use a light-loading detection circuit 24 and in which intermittent switching operation is not performed by the switching element 1, a similar implementation is possible, and similar advantageous results can be obtained.

(Embodiment 4)

The semiconductor device for controlling switching power supply of Embodiment 4 of the invention is explained.

Figure 15:
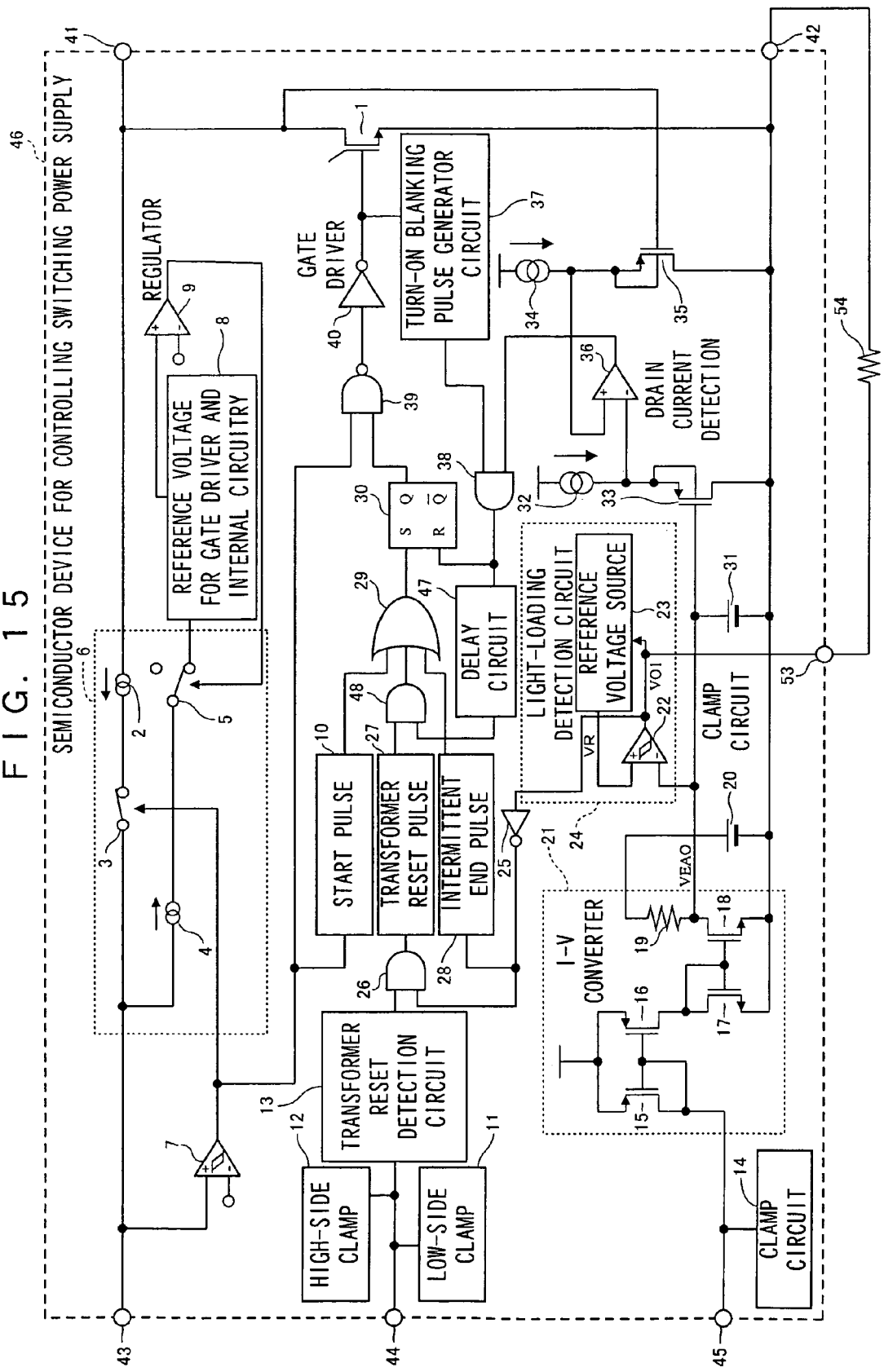
FIG. 15 is a circuit diagram showing one configuration example of a semiconductor device for controlling switching power supply according to Embodiment 4 of the invention; and, FIG. 16 is a circuit diagram showing one configuration example of a semiconductor device for controlling switching power supply according to a prior art.

FIG. 15 is a circuit diagram showing one configuration example of a semiconductor device for controlling switching power supply of Embodiment 4 of the invention. As shown in FIG. 15, this semiconductor device for controlling switching power supply 46 is configured with a resistance 54 connected externally between a terminal (GND) 42 and the terminal 53 connected to the output of the light-loading detection comparator 22 of the light-loading detection circuit 24 in the semiconductor device for controlling switching power supply of Embodiment 1 shown in FIG. 1, and with a delay circuit 47 provided similarly to FIG. 1.

That is, in this semiconductor device for controlling switching power supply 46 a terminal 53 is provided for use in arbitrarily setting the standby detection voltage; an external light-loading detection voltage adjustment resistance 54, which is the means of changing the detection voltage, can be connected. Otherwise the configuration is similar to the configuration of the semiconductor device for controlling switching power supply 46 shown in FIG. 1.

In a semiconductor device for controlling switching power supply configured as described above, operation by the delay circuit 47 to delay the turn-on timing of the switching element 1 is similar to that of the semiconductor device for controlling switching power supply shown in FIG. 1, and so the explanation below mainly addresses operation in the light-loading detection circuit 24.

The light-loading detection voltage adjustment resistance 54 is provided between a reference potential and the potential of the negative terminal of the light-loading detection comparator 22 in order to adjust the reference voltage output from the reference voltage source 23; by changing the value of this light-loading detection voltage adjustment resistance 54, the light-loading detection voltage VR input to the positive-side terminal of the light-loading detection comparator 22 is adjusted.

Thus, by providing a light-loading detection voltage adjustment resistance 54, and arbitrarily adjusting the light-loading detection voltage, the load current can be optimally adjusted when stopping and resuming switching operation by the switching element 1, according to the load required during light loading while in standby mode.

The configuration of the above semiconductor device for controlling switching power supply in which a resistance 54 is externally connected between a terminal 42 and a terminal 53 connected to the output of the light-loading detection comparator 22 can be applied to the semiconductor devices for controlling switching power supply of each of the above-described Embodiments with a light-loading detection circuit 24 provided, to obtain similar advantageous results.

Thus, in the semiconductor devices for controlling switching power supply of each of the above Embodiments, by newly providing a configuration for action to delay the timing with which a switching element is turned on in a configuration for intermittent switching operation of the switching element, further improvement of the power supply efficiency can be realized. In products which place emphasis on energy conservation, for the W/W input currently attracting attention, standby power consumption of 0.1 W or less is possible.

What is claimed is:

1. A semiconductor device comprising a switching element for controlling a switching power supply comprising the switching element and a transformer, wherein a DC input voltage is applied to said switching element through primary windings of said transformer, a switching operation of said switching element for controlling the DC voltage by rectifying and smoothing an alternating current across secondary windings of said transformer, said semiconductor device comprising a control circuit, said control circuit, comprising:

a transformer reset detection circuit for detecting a reset state of said transformer due to a switching operation of said switching element from an AC voltage across tertiary windings of said transformer, and for outputting a transformer reset detection signal indicating the reset state;

an I-V converter for converting into a voltage a current value of a control current indicating a change in said DC voltage based on the alternating current across the secondary windings of said transformer; and, a current detection signal output device for detecting a value of a current flowing in said switching element based on an output voltage from said I-V converter, and for outputting a current detection signal for controlling a switching turn-on action of said switching element according to the detected value, wherein a control electrode of said switching element is driven by said control circuit based on a transformer reset detection signal from said transformer reset detection circuit and a current detection signal from said current detection signal output device, said control electrode for controlling operation of said switching element, said semiconductor device further comprising a delay circuit for applying a prescribed delay time to the current detection signal outputted from said current detection signal output device, the delay circuit for applying a prescribed mask time to delay the transformer reset detection signal until said current detection signal is outputted to halt switching operation of said switching element.

2. The semiconductor device according to claim 1, wherein a component for determining said delay time of said delay circuit is connected externally, and said delay circuit is configured such that said delay time is determined according to a constant of the externally connected component.

3. The semiconductor device according to claim 1, wherein said delay circuit is configured such that said delay time is determined automatically according to the current value of said control current which changes according to fluctuations in said loading state.

4. The semiconductor device according to claim 1, further comprising a light loading detection circuit for outputting a control signal to control intermittent operation of switching by said switching element upon detection of a light load state, which indicates the power supplied to said load based on a change in output voltage from said I-V converter, wherein said light loading detection circuit is configured to output a control signal to control said intermittent operation such that switching operation of said switching element is halted when the output voltage from said I-V converter falls below the light loading detection lower limit voltage for detection of said light loading, and such that the switching operation of said switching element is resumed when the output voltage from said I-V converter rises above the light loading detection upper limit voltage for detection of said light loading, and the control electrode of said switching element is driven, by means of said control circuit, to control said intermittent operation based on the transformer reset detection signal from said transformer reset detection circuit and the control signal from said light loading detection circuit.

5. The semiconductor device according to claim 1, wherein said switching element and said control circuit are integrated on the same semiconductor substrate, and said semiconductor device further comprising external connection terminals on said semiconductor substrate, said external connection terminals comprising:

a switching element input terminal for inputting said input voltage to said switching element through the primary windings of said transformer, a switching element output terminal for outputting the switching current obtained by switching operation of said switching element, a power supply terminal for supplying to said control circuit a DC voltage based on the current appearing across the tertiary windings of said transformer through switching operation of said switching element, a control terminal for inputting a control signal to control switching operation of said switching element based on the DC voltage across the secondary windings of said transformer which changes according to said load state, and a transformer reset detection terminal for supplying said transformer reset detection signal to said transformer reset detection circuit.

6. The semiconductor device according to claim 4, wherein said switching element and said control circuit are integrated on the same semiconductor substrate, and said semiconductor device further comprising external connection terminals on said semiconductor substrate, said external connection terminals comprising:

a switching element input terminal for inputting said input voltage to said switching element through the primary windings of said transformer, a switching element output terminal for outputting the switching current obtained by switching operation of said switching element, a power supply terminal for supplying to said control circuit a DC voltage based on the current appearing across the tertiary windings of said transformer through switching operation of said switching element, a control tenninal for inputting a control signal to control switching operation of said switching element based on the DC voltage across the secondary windings of said transformer which changes according to said load state, and a transformer reset detection terminal for supplying said transformer reset detection signal to said transformer reset detection circuit.

* * * * *